United States Patent [19]

Naito

[11] Patent Number: 5,668,212
[45] Date of Patent: Sep. 16, 1997

[54] AQUEOUS ORGANOSILOXANE LIQUID COMPOSITION AND ITS USE

[75] Inventor: Hiroyuki Naito, Tokyo, Japan

[73] Assignee: Shizu Naito, Tokyo, Japan

[21] Appl. No.: 680,702

[22] Filed: Jul. 17, 1996

Related U.S. Application Data

[63] Continuation of Ser. No. 138,421, Oct. 20, 1993, abandoned.

[30] Foreign Application Priority Data

Oct. 6, 1992 [JP] Japan ................................ 4-267544
Oct. 22, 1992 [JP] Japan ................................ 4-284761

[51] Int. Cl.$^6$ ................................................ C08K 3/02
[52] U.S. Cl. .................. 524/701; 524/837; 524/863; 524/858; 524/861; 524/838; 524/780; 524/706; 524/730; 524/794; 524/779; 524/786; 524/789; 524/783; 524/731
[58] Field of Search ................................ 524/837, 863, 524/858, 861, 838, 701, 780, 706, 730, 794, 779, 786, 789, 783, 731

[56] References Cited

U.S. PATENT DOCUMENTS

| | | | |
|---|---|---|---|
| 4,537,944 | 8/1985 | Imai et al. | 524/859 |
| 4,921,895 | 5/1990 | Schaefer et al. | 524/838 |
| 5,000,029 | 3/1991 | Laurent et al. | 524/588 |
| 5,281,658 | 1/1994 | Ona et al. | 524/838 |
| 5,292,799 | 3/1994 | Naite et al. | 524/789 |

FOREIGN PATENT DOCUMENTS

| | | |
|---|---|---|
| 57-94057 | 6/1982 | Japan . |
| 60-51756 | 3/1985 | Japan . |
| 3-68676 | 3/1991 | Japan . |

*Primary Examiner*—Karen A. Dean
*Attorney, Agent, or Firm*—Armstrong, Westerman, Hattori, McLeland & Naughton

[57] ABSTRACT

An aqueous organosiloxane liquid composition in a homogeneous state is disclosed, which contains (A) aqueous modified organosilicon compound having at least one polyether group as a side chain, (B) liquid organopolysiloxane, (C) a cross-linking agent, (D) a curing catalyst and, optionally, (E) a filler. This composition undergoes uniform curing, when exposed to the atmosphere of a temperature of up to 300° C., to form a siloxane polymer composition in a form of a film, fibers, a composite structure, a composite sheet or a building material. The composition can also be used as a coating composition or varnish.

14 Claims, No Drawings

AQUEOUS ORGANOSILOXANE LIQUID COMPOSITION AND ITS USE

This application is a continuation of application Ser. No. 08/138,421 filed Oct. 20, 1993 now abandoned.

BACKGROUND OF THE INVENTION

This invention relates to an aqueous organosiloxane liquid composition compounded with an aqueous modified organosilicon compound, and uses thereof. More particularly, it relates to an aqueous organosiloxane liquid composition compounded with an aqueous modified organosilicon compound, which can form, when exposed to the atmosphere of up to 300° C., a siloxane polymer composition having polysiloxane bonds as a main chain and being used for forming a film, fibers, a coating material (e.g. paint), a binder, a composite structure, a composite sheet or a building material and uses of the composition.

The curing reaction mechanism of polymerization of organosiloxane to form a siloxane cured product is considered a condensation reaction or addition reaction of reactive siloxane in the presence of water. With the organosiloxane of the present invention, too, functional alkoxy groups react with water to cause a dealcoholation reaction and produce silanol groups (first step). Then, the silanol groups in turn react with the alkoxy groups of a cross-linking agent to undergo a condensation reaction (e.g., dealcoholation, deoximation, removal of acetic acid, etc.), resulting in polymerization and formation of a polymeric siloxane cured product having a three-dimensional network structure (second step).

On the other hand, organosiloxane compounds, particularly silicone oils, show such high water-repellent properties that they fundamentally repel water.

In general, varnishes, coating compositions, adhesives, fibers, and the like are mainly based on organic resins and secondarily organic solvents. Recent living environmental regulations have required incombustible or fire retardant, pollution-free materials in increasing fields. Under such situations, conventional coating compositions involve many problems since they contain an organic solvent which is dangerous and can cause environmental pollution and contain as a major component an organic resin which is susceptible to sunlight and has less weatherability in comparison with inorganic materials and is susceptible to heat or fire and highly flammable. Hence, pollution-free, Earth-friendly substitute materials involving no such problems and being used for a coating composition have eagerly been desired in many fields.

In order to meet the requirement, siloxane compounds which have —Si—O— bonds resistant against heat or light and against chemical oxidation and which have good weatherability and high heat resistance have widely been investigated, part of the investigation results having been put into practice. Typical examples of the results and remaining problems are described hereinafter mainly referring to coating compositions and coating materials.

As a popular example of applying organosiloxanes to coating compositions, there are illustrated anti-corrosive zinc-rich coating compositions developed in World War II and capable of forming a coating film upon being dried at ordinary temperature.

There have been developed coating compositions prepared by diluting, with an organic solvent, polymers of organosiloxane or modified organosiloxane or copolymers thereof with various organic compounds, together with or without other organic resins. Most of the conventionally developed techniques are based on the above-described compositions. For example, a technique of forming a heat-resistant, anti-corrosive coating by air-drying or hot-air drying is disclosed in, for example, Japanese Examined Patent Publication No. 63-28942, and a technique of diluting an organosiloxane with an organic solvent and forming a film using the composition at an ordinary temperature or under heating is disclosed in many publications such as Japanese Examined Patent Publication No. 63-58191.

There have been many examples of merely combining organic compounds (organic resins) and organosiloxanes to prepare coating materials or the like. Most of them require heating upon film formation. Typical example thereof is described in Japanese Examined Patent Publication No. 55-41274, etc.

Many studies have been made on utilization of organosiloxane as heat-resistant coat. Japanese Examined Patent Publication No. 63-35183 discloses one typical example thereof wherein a coating composition containing a modified silicone resin as a major component is baked at 180° C. to form a heat-resistant coat.

As an example of utilizing pure organosiloxane, there is illustrated a technique of preparing a durable, stainproof transparent film composed of organopolysiloxane (Japanese Unexamined Patent Publication No. 3-68676).

A technique of using a keto-enol tautomer compound for stabilizing a curing catalyst of a metal-containing organic compound in the polymer-forming organosiloxane has also been disclosed in Japanese Examined Patent Application No. 48-17859 and Japanese Unexamined Patent Application No. 1-129066.

Techniques of curing a one-pack type organosiloxane composition at an ordinary temperature are disclosed in U.S. Pat. Nos. 3,294,739, 3,647,917 and 4,111,890.

However, these patents do not disclose a technique of previously incorporating water in a homogeneous state in the liquid organosiloxane and forming a siloxane polymer composition by the action of the incorporated water, much less a technique of utilizing the water-retaining ability of an organosilicon compound having at least one polyether group for effectively incorporating water in the liquid organosiloxane.

The inventor has formerly made an invention relating to a solvent-free organosiloxane composition which, when subjected to specific conditions, can be cured at an ordinary temperature or under heating to provide a product such as a coating material and a binder, and have filed the invention as Japanese Patent Application Nos. 4-180127 and 4-36273.

Furthermore, the inventor has suscessively found that sufficient flexibility and adhesively expanding or contracting properties to the expansion or contraction of a substrate can be given to a produced siloxane polymer by controlling the content of the total metal elements in the solvent-free organosiloxane liquid composition at a level of 25% by weight to less then 40% by weight in terms of $MO_{y/2}$ wherein M represents a metal) and have filed a patent application directed to this technique (Japanese Patent Application No. 5-248358

In this specification, the term "homogeneous state" means that any portion of the composition has the same formulation without forming two or more portions.

In this specification, the silicon content or concentration is in some cases presented in terms of "$SiO_2$ % by weight" on the basis of its oxide. Similarly, the content or concentration of the total metal elements (aluminum, boron, silicon, titanium, zirconium, zinc, cobalt, etc.) is in some cases presented in terms of "$MO_{y/2}$ % by weight" on the basis of their oxides.

Several words are defined as follows and will be described in detail in the specific description of the invention to be described hereinafter.

The term "siloxane polymer composition" is an abbreviated term for a cured siloxane product containing a main chain of polysiloxane bonds produced by exposing the aqueous organosiloxane liquid composition to the atmosphere of up to 300° C. This term "siloxane polymer composition" is a general term for cured siloxane products constituting a shaped polymer composition, an adhesive polymer composition, a composite structure, a composite sheet and a building material to be defined hereinafter.

The term "shaped polymer composition" means a shape-retaining polymer composition which is composed of a cured product of the organosiloxane liquid composition of the present invention and is shaped in a particular form such as a film, a thin plate, a sheet, fibers, a string, a mass, a sphere, a rectangular member, etc.

The term "adhesive polymer composition means a polymer composition which forms a coating film or a binder adhering to the surface of various substrates and can be used as, for example, a coating composition, a varnish, an undercoating composition, a protective coating material having some thickness, an adhesive, a binder, a joint mixture, an agent for binding aggregates, a cementing material, and an anchor-fixing material.

The term "composite structure" means a structure wherein a cured product of the organosiloxane liquid composition of the present invention functions to unify a reinforcing material in a various shape such as a honeycomb, a massive structure, a plate, a net, fibers, a cloth, etc, aggregates, moldings, or a shaped product.

The term "composite sheet" means a sheet wherein a cured product of the organosiloxane liquid composition of the present invention unifies with a base material in a form of a sheet, net, cloth or texture.

The term "building material" means a building material wherein a cured product of the organosiloxane liquid composition of the present invention is coated on the surface of a building material base such as a metal product, a concrete product made of, for example, cement, a ceramic or clay product, a product of a natural material such as wood or bamboo, a synthetic product thereof, etc.

One of the important factors is "water". That is, "water" fundamentally repels a liquid organosiloxane compound, and they are in a so-called "water-oil" relationship with each other. Therefore, a system containing both a liquid organosiloxane compound and water fundamentally does not form a homogeneous state, but forms two separate phases. On the other hand, "water" functions to polymerize the liquid organosiloxane compound according to the moisture-curing mechanism as has been set forth hereinbefore.

The inventor has noted this antinomic relationship between "water" and the organosiloxane compound, and has searched the proper conditions under which important "water" effectively acts on the organosiloxane. As a result, the inventor has found that "water" can previously be incorporated in the organosiloxane liquid composition of the present invention in a homogeneous state under special conditions, and that the incorporated water effectively functions from inside of the liquid composition to produce a useful siloxane polymer composition as a result of uniform curing.

As has been seen with the above-described prior art, the application of the organopolysiloxane as a coating component has begun with its auxiliary addition to an organic compound-based coating composition containing an organic polymer or an organic resin having a main chain of C—C bonds and being excellent in filming properties, dilution properties with a solvent and drying properties after being coated for the purpose of improving the coating composition.

Hence, these conventional coating compositions inevitably contain the dangerous, trouble-causing organic solvents, and there have been seen no positive attempts to produce and commercialize solvent-free coating compositions mainly using organosiloxane, and an incombustible or fire retardant siloxane polymer composition such as a shaped polymer composition in a form of film or fiber and an adhesive polymer composition such as a coating material or an adhesive.

The inventor has given attention to the following fundamental problems which conventional films, fibers, coating compositions, coating materials, binders, structures, sheets, building materials, etc. utilizing the above-described prior art polymers and to the fact that there have been no techniques which take into consideration protection of the environment of the earth and saving of energy and labor.

1) In the case of using an organic compound having —C—C— bonds as the main chain:
  (a) use of an organic solvent which is dangerous and harmful is inevitable;
  (b) the composition is quite susceptible to oxidation by heat or fire;
  (c) a poisonous and harmful gas is produced upon combustion;
  (d) the composition provides quite poor weatherability.

2) In the case of using water glass having incombustible —Si—O— bonds as the main chain:
  (a) the composition provides poor flexibility;
  (b) the composition provides poor alkali resistance due to its high reactivity with an alkali metal element;
  (c) cured products formed due to hydraulic property contain many pores through which water has gone, and thus the products lack water impermeability;
  (d) the composition has poor adhesion properties to an organic material, and cannot be applied to a coated surface;

3) In the case of using a polymer having organosiloxan as the main material:
  (a) there have been no techniques of applying solvent-free organosiloxane to formation of a three dimensional polymer;
  (b) there have been no complete techniques of applying the material to a coating composition, etc. permitting site application;
  (c) there have been no popular coating compositions capable of forming an incombustible or fire-retardant, seemingly thick, beautiful, lustrous coat; and
  (d) this material is liable to suffer stain due to its high insulating properties.

SUMMARY OF THE INVENTION

As a result of intensive investigations on an organopolysiloxane composition noting the advantageous features of siloxane bond (Si—O bond) that (a) it has a strong atomic bond energy and is therefore resistant against heat or light, (b) it absorbs less light rays of ultraviolet ray region and has therefore excellent weatherability and (c) it permits easy rotation of bond due to its long atomic bond distance and low electron density and therefore provides a high flexibility and noting the fact that (d) water performs an important role in the reaction of forming polysiloxane bonds, the inventor has found the conditions for uniformly incorporating water in the organosiloxane liquid composition and has found that this aqueous organosiloxane liquid composition exhibits the following characteristic features:

1. A water-containing or aqueous, homogeneous liquid composition can be prepared by previously dissolving water in an organosilicon compound having at least one polyether group and compounding the resulting solution with a liquid siloxane compound. In addition, the water to be used may be acidic or alkaline water.
2. When the structural main chain of the fundamental skeleton consists of siloxane units $[(-Si-O-)_n]$ and the content of the total metal elements of the composition is controlled within the range of from 20% by weight to less than 65% by weight in terms of $MO_{y/2}$, there can be formed a siloxane polymer composition which has sufficient heat resistance with no fragility and which exhibits good adhesion to an expanding or contracting substrate. In addition, this system can be maintained in a liquid state without any solvent.
3. When the above-described specific organosiloxane liquid composition is exposed to the atmosphere at a temperature of up to 300° C., a uniform siloxane cured product having polysiloxane bonds as a main chain is produced in a short time to provide a shaped polymer composition, an adhesive polymer composition, a composite structure, a composite sheet, a building material, etc.
4. The resulting cured product undergoes less stain, since insulation of the polymer is broken due to the presence of hydrophilic polyether groups in the product.

It is an object of the present invention to provide an aqueous organosiloxane liquid composition which contains materials friendly to the environment of the earth, which can solve the above-described problems which have not been solved by the prior art, and which can form a beautiful, flexible, well adhesive, heat-resistant and durable siloxane polymer composition in a short time, thus finding application to a film, fibers, a coating material, a varnish, an adhesive, a composite structure, a composite sheet or a building material.

Other objects, features and advantages of the present invention will become apparent from the detailed description of the preferred embodiments of the invention to follow.

With the above-described objects in mind, the inventor has made intensive investigations and has completed the present invention.

According to the present invention, there is provided an aqueous organosiloxane liquid composition in a homogeneous state, which contains (A) aqueous modified organosilicon compound having at least one polyether group and containing dissolved therein up to 50% by weight of water, in an amount of at least 30% by weight.

The present invention further provides the aqueous organosiloxane liquid composition as described above, wherein said water is acidic water having a pH of at least 3 or alkaline water having a pH of 7 to less than 10.

The present invention further provides the aqueous organosiloxane liquid composition as described above, wherein said organosiloxane liquid composition is a quaternary liquid composition comprising (A) aqueous modified organosilicon compound, (B) liquid organopolysiloxane, (C) a cross-linking agent and (D) a curing catalyst; said organopolysiloxane (B) being a low molecular weight polysiloxane compound having organosilicon group of X—Si wherein X represents a hydrogen atom or a monovalent hydrocarbyl group and functional side chain of OR wherein R represents a hydrogen atom or a $C_1$–$C_5$ alkyl group, said cross-linking agent (C) being one or more organometallic compounds having a monovalent organic group and at least one functional group selected from the group consisting of an alkoxy group, an acyloxy group and an oxime group, and said curing catalyst (D) being one or more metal-containing organic compounds.

The present invention further provides the aqueous organosiloxane liquid composition as described above, wherein said liquid organopolysiloxane (B) is one or more low molecular weight polysiloxanes represented by the following general formula (1):

wherein $R^1$ represents a hydrogen atom or a $C_1$ to $C_5$ alkyl group, $R^2$ to $R^6$, which may be the same or different, each represents a hydrogen atom, $OR^1$ or a monovalent hydrocarbyl group, and n represents a number smaller than 15, and having a silicon content of 50% by weight or more on the basis of $SiO_2$.

The present invention further provides the aqueous organosiloxane liquid composition as described above, wherein said cross-linking agent (C) comprises one or more organometallic compounds represented by the following general formula (2) or (3):

$$R^7_pN.(OR^1)_{3-p} \quad (2)$$

$$R^7_mQ.(OR^1)_{4-m} \quad (3)$$

wherein N represents aluminum or boron, Q represents silicon, titanium or zirconium, $R^1$ represents a hydrogen atom or a $C_1$–$C_5$ alkyl group, $R^7$ represents a hydrogen atom, $OR^1$ or a monovalent hydrocarbyl group, p represents an integer of 0, 1 or 2, and m represents an integer of 0, 1, 2 or 3 and is compounded in an amount of up to 70% by weight, or said cross-linking agent (C) is an organotrialkoxysilane constituted by a monovalent organic group having at least an amino group.

The present invention further provides the aqueous organosiloxane liquid composition as described above, wherein said liquid organopolysiloxane (B) containing aqueous modified organosilicon compound (A), said cross-linking agent (C) or a mixture thereof contains dissolved therein a solid silicone resin (SR) having functional side chains of OR groups wherein R represents a hydrogen atom or a $C_1$–$C_5$ alkyl group in an amount of up to 70% by weight.

The present invention further provides the aqueous organosiloxane liquid composition as described above, wherein said liquid organopolysiloxane (B) containing aqueous modified organosilicon compound (A), said cross-linking agent (C) or a mixture thereof contains dissolved therein a thermoplastic resin (HR) of linear organic high molecular compound having acyl groups in an amount of up to 60% by weight.

The present invention further provides the aqueous organosiloxane liquid composition as described above, wherein said liquid organopolysiloxane (B) containing aqueous modified organosilicon compound (A), said cross-linking agent (C) or a mixture thereof has been compounded with 1 to 500 parts by weight of a filler (E) of one or more members selected from the group consisting of an activating agent, a filler, a pigment and a colorant per 100 parts by weight of said liquid organopolysiloxane (B) containing aqueous modified organosilicon compound (A), said cross-linking agent (C) or a mixture thereof.

The present invention further provides the aqueous organosiloxane liquid composition as described above, wherein said activating agent is a powder of one or more of a boric acid-containing compound, a chromic acid-containing compound and a phosphoric acid-containing compound.

The present invention further provides the aqueous organosiloxane liquid composition as described above, wherein said curing catalyst (D) is one or more of metal-containing organic compounds, with the metal being zinc, cobalt, aluminum, titanium, zirconium or tin.

The present invention further provides the aqueous organosiloxane liquid composition as described above, wherein said curing catalyst (D) is in a blocked form of being unable to catalyze the reaction, with the blocking being attained with at least one keto-enol tautomer compound selected from the group consisting of alkyl group- or trifluoro group-containing β-keto-acid esters, β-diketone compounds and malonic esters in an amount of up to 50% by weight.

The present invention further provides the aqueous organosiloxane liquid composition as described above wherein said curing catalyst (D) is retarded with one or more alcohols selected from the group consisting of monohydric alcohols and polyhydric alcohols in an amount of up to 50% by weight to thereby retard the catalytic reaction, or said curing catalyst (D) of said metal-containing organic compound is combined or is not combined with said keto-enol tautomer compound or said alcohol is contained in an amount of up to 20% by weight.

The present invention further provides the aqueous organosiloxane liquid composition as described above, wherein the total content of the metal elements of said quaternary liquid composition is from 20% by weight to less than 65% by weight in terms of $MO_{y/2}$ wherein M represents a metal element and y represents a valency of the metal atom, or the total content of the metal elements of said quaternary liquid composition is solvent-free from 30% by weight to less than 65% by weight in terms of $MO_{y/2}$ wherein M represents a metal element and y represents a valency of the metal atom.

The present invention further provides a shaped polymer composition of siloxane cured product, which is formed by exposing said aqueous organosiloxane liquid composition described above to the atmosphere at a temperature of up to 300° C. to thereby form a main chain of polysiloxane bonds.

The present invention further provides an adhesive polymer composition in a form of coating or binder, which is formed by exposing said aqueous organosiloxane liquid composition described above to the atmosphere at a temperature of up to 300° C. to thereby form a main chain of polysiloxane bonds.

The present invention further provides a composite structure which is formed by preparing a composite mixture of 100 parts by weight of the aqueous organosiloxane liquid composition described above and 1 to 2,000 parts by weight of one or more of reinforcing materials, aggregates and moldings, and exposing the composite mixture to the atmosphere of up to 300° C. to thereby form a main chain of polysiloxane bonds, and a composite sheet which is formed by applying the aqueous organosiloxane liquid composition described above to a cloth- or net-like base material to impregnate, then exposing the impregnated base material to the atmosphere of up to 300° C. to thereby produce a composite polymer wherein the cured polymer containing as main chain polysiloxane bonds is unified with the base material.

The present invention further provides a building material which is formed by coating the aqueous organosiloxane liquid composition described above to a plate-shaped or particularly shaped building material base, then exposing the coated base material to the atmosphere of up to 300° C., to thereby produce a coating material formed of the cured polymer containing as main chain polysiloxane bonds.

DETAILED DESCRIPTION OF THE PREFERRED EMBODIMENTS OF THE INVENTION

As has been described hereinbefore, conventional siloxane polymer compositions have been produced based on the mechanism that the curing reaction of a starting liquid organosiloxane is initiated only when the starting material is brought into contact with water supplied from outside (for example, moisture contained in the atmosphere). In such a curing reaction, however, the polymerization rate is determined by the diffusion velocity of water into the reaction system, said water having been brought into contact with the starting material. Hence, curing of the starting material tends to proceed in proportion to the distance from the outer surface and, therefore, the polymer composition shows non-uniform properties before completion of the curing reaction. Thus, a polymer composition showing uniform properties is difficult to obtain.

In order to obtain an organosiloxane polymer composition having uniform properties, a technique of rapidly attaining uniform properties throughout the cured product is required.

In general, kinds and amounts of curing catalysts are examined for the purpose of accelerating the curing reaction of an organosiloxane liquid composition. However, since water triggers the curing reaction as described hereinbefore, it is necessary to attach importance to water which participates in the curing reaction before initiation of the condensation reaction of alkoxy groups, etc. in which curing catalysts participate.

Therefore, it is of importance to incorporate water in the reaction system to thereby uniformly initiate the reaction. However, an organosiloxane compound and water are essentially in an oil-water relationship, and hence a uniformly mixed system can not be obtained unconditionally.

As a result of intensive investigation and experiments on the above-described points, the inventor has found that:

(1) an aqueous modified organosilicon compound can be prepared by dissolving water in an organosilicon compound having at least one polyether group as a side chain or a terminal group;

(2) the aqueous modified organosilicon compound containing dissolved therein water can be readily dispersed in an organosiloxane liquid composition to attain a uniform state;

(3) when the aqueous modified organosilicon compound further has an alkoxy group, it can be a constituent of the polymer composition together with the organosiloxane liquid composition, the cross-linking agent, etc;

(4) curing reaction of an aqueous organosiloxane liquid composition prepared under the above-described conditions is readily initiated by exposing the liquid composition to a temperature of up to 300° C., and is completed in the shortest time under the particular conditions to form a polymer composition with desired properties; and (5) water to be employed may contain an acidic material to a degree of 3 to less than 7 in pH or may contain a basic material to a degree of 7 to less than 10 in pH, and such water exhibits an additional catalytic action to obtain better properties.

Thus, the inventor has found an aqueous modified organosilicon compound (A).

The polyether group bound to the side chain or a terminal group is a linear molecule containing ether bonds (—O—) and is generally a polymer compound constituted by the repeating unit of [—M—O—] wherein M usually represents a methylene group, a polymethylene group or the derivative thereof. These compounds are generally synthesized by addition polymerization of an aldehyde or ring-opening polymerization of a cyclic ether.

Mutual dissolution of the organosilicon compound having at least one polyether group bound to a side chain or a terminal group and water may be attributed to the properties of the polyether group. That is, since the polyether group has both the properties of ether group and that of oxy group represented by alcohols, the organosilicon compound shows the ability of dissolving a rubber, a resin, a cellulose ester, etc. based on the ether feature of the polyether group and the ability of well dissolving water based on the oxy feature of the polyether group. In this situation, the oxy groups are considered to be associated to form a bigger molecule due to formation of hydrogen bonds and retain water therein.

Presence of the aqueous modified organosilicon compound (A) in the liquid composition of the present invention is important not only in that water is previously introduced into the system uniformly but in that residual water in the system is enclosed by the aqueous modified organosilicon compound, thus the residual water being blocked. That is, as is described above, the modified organosilicon compound having at least one polyether group bound to a side chain or a terminal group thereof is also important in that it functions to bind water molecules through hydrogen bonds and serves to properly control the action of water.

In order to impart incombustible or fire-retardant, heat-resistant properties to the cured siloxane polymer composition, it is necessary to exclude a combustible solvent, decrease the content of heat-susceptible organic component and increase the content of metals, particularly silicon. On the other hand, if the content of metals is too much, the cured siloxane polymer composition tends to exhibit inorganic properties such as high hardness and high breakability, and the objects of the present invention to attain high flexibility and good adhesion to an expanding or contracting substrate are not obtained.

The inventor has made intensive investigations to develop a product which shows excellent inorganic features such as high incombustibility or fire retardant properties and excellent heat-resistance and yet shows excellent organic features such as good flexibility and adhesively expanding or contracting properties. As a result, it has been found that a solvent-free, aqueous organosiloxane liquid composition capable of attaining the objects of the present invention can be obtained by controlling the content of the total metal elements of a specific mixed ternary liquid composition which comprises an aqueous modified organosiloxan compound (A), a liquid organopolysiloxane (B) having a polymerization degree of a specific range, a cross-linking agent (C) and a curing catalyst (D) to 20% by weight to less than 65% by weight, preferably 30% by weight to less than 65% by weight.

It is of importance that the siloxane polymer composition of the present invention has a fundamental skeleton constituted by —Si—O—Si— bonds which are tough, strong, and incombustible or fire-retardant, and that the liquid organopolysiloxane (B) constituting the —Si—O—Si— bonds is polymerized to some extent so that the silicon content thereof becomes 50% by weight or more in terms of $SiO_2$.

In order to increase the silicon content of organopolysiloxane to 50% by weight or more, preferably 53% by weight or more, in terms of $SiO_2$, it is necessary to polymerize organosiloxane to the degree of oligomer or more than that.

In addition, it is effective for the liquid organopolysiloxane (B) to have previously formed polymeric —Si—O—Si— bonds which will form the fundamental skeleton of the cured siloxane polymer composition of the present invention in view of increasing its $SiO_2$ content and predetermining the chemical structure of the cured product.

Furthermore, use of such semi-polymeric organopolysiloxane serves to shorten the time necessary for the completion of the polymerization, thus being advantageous in view of production efficiency.

Such semi-polymeric organosiloxane is represented by the foregoing general formula (1) wherein n of [—Si—O—]$_n$ is at least two. On the other hand, if n becomes too large, the liquid viscosity of the organosiloxane increases so much that it becomes difficult to ensure good workability as a coating composition without a diluent such as an organic solvent.

Since the present invention intends to use a material and a method which are friendly to the environment of the earth, use of organic solvents causing various troubles must be avoided. Therefore, there is naturally an upper limit as to the silicon content or the polymerization degree to ensure a good liquid state and a good workability.

An important feature of the liquid organosiloxane (B) of the present invention is that organic groups are directly bound to silicon atoms not through oxygen atom as is different from inorganic polymer containing siloxane bonds. In particular, it is important for the organosiloxane to have sufficient sized organic groups (e.g., an alkyl group, a phenyl group, a glycidoxy group, a methacryloxy group, an aminoalkyl group, etc.) to protect the siloxane bonds for the purpose of effectively exhibiting good flexibility, water-repelling properties, water impermeability and alkali resistance which inorganic siloxane polymers do not possess. As the organic group, an alkyl group and a phenyl group are particularly preferred.

In addition, it is necessary for the formed polymer to have a dense, strong, three-dimensional network structure for obtaining cured products with good and useful properties. However, a cross-linking agent having only two or less functional groups yields only a linear polymer, thus failing to form an effective, three-dimensional network polymer.

In order to form a dense, tough, three-dimensional polymer, it is necessary to use a cross-linking agent (C) having at least three functional groups and cause the cross-linking reaction at many intermediate sites of the matrix polymer to form a three-dimensional structure wherein polymer chains extend in all directions.

Accordingly, the cross-linking agent (C) performs important functions in completing the present invention. As such cross-linking agents, organometallic compounds having reactive functional groups of —OR and represented by the general formula (2) of $[R^7_p N(OR^1)_{3-p}]$ or the general formula (3) of $[R^7_m Q(OR^1)_{4-m}]$ wherein N represents a trivalent aluminum or boron, Q represents a tetravalent silicon, titanium or zirconium, $R^1$ represents a hydrogen atom or a $C_1$–$C_5$ alkyl group, $R^7$ represents a hydrogen atom, a group of $OR^1$ or a monovalent hydrocarbyl group, p represents an integer of 1 or 2, and m represents an integer of 1, 2 or 3 are found to be effective.

In particular, it is necessary to well examine the type of the organic group directly bound to the silicon atom of the cross-linking agent (C) for imparting sufficient flexibility and adhesion properties to the cured siloxane polymer composition, and d the organic group is preferably an alkyl group having a large number of carbon atoms, a phenyl group, a glycidoxy group, a methacryloxy group or an aminoalkyl group.

It is an important feature of the cross-linking agent (C) of the present invention that aluminum, boron, silicon, titanium or zirconium in the organometallic compound is directly bound to Si—O bond constituting a cured polymer to be formed, thus performing functions as a constituent member of the resulting polymer. Partial presence of these trivalent or tetravalent metal elements having sizes different from that of silicon in the main polymer chains of Si—O bonds serves to change the structure of the cured product from a completely regular structure to a partially irregular structure, which imparts an effective space to the structure of cured product. This space gives the cured product sufficient toughness.

In this situation, it is important to incorporate a siloxane compound containing an organic group such as an alkyl group having a large number of carbon atoms, a phenyl group, a methacryloxy group or a glycidoxy group or an organic compound of aluminum, boron, titanium or zirconium in the liquid composition.

However, this incorporation leads to a decrease in the content of the metal component in the liquid composition, which tends to deteriorate incombustibility or fire-retardant properties and heat resistance to some extent. In comparison with polymer products composed of an organic resin, however, the siloxane composition having a lower content of metal components still shows much higher heat resistance, etc.

It is another important feature of the cross-linking agent (C) of the present invention that, as will be described in more detail hereinafter, the cross-linking agent (C) of organometallic compound containing aluminum, boron, titanium or zirconium functions both as a cross-linking agent and as a curing catalyst. Therefore, selection of the cross-linking agent (C) must be made in full consideration of the kind and amount of the curing catalyst (D) to be described hereinafter.

What is important in the present invention is that it has been found that, in place of an organic solvent having conventionally been used for dissolving a solid resin (including a silicone resin), a liquid organosiloxane such as methyltrimethoxysilane, phenyltrimethoxysilane or a liquid organopolysiloxane can be used for dissolving a solid high molecular compound.

As a specific example thereof, the inventor has found that, when a previously highly polymerized, solid silicone resin (SR) is dissolved in a solvent of liquid organosiloxane in an amount of up to 30% by weight and the resulting solution is incorporated in the liquid composition of the present invention, the resulting composition can advantageously be used as a coating composition or a binder. Such liquid composition has the merit that liquid viscosity of the liquid composition can be controlled to a higher level suitable for a particular work and that structure and properties of the resulting cured siloxane polymer composition can be predetermined since a silicone resin having a known polymeric state is incorporated in an amount within a specific range.

In addition, as an application of the above-described knowledge, the inventor has found that, when a thermoplastic resin composed of a linear organic polymer compound is dissolved in the organosiloxane utilizing its dissolving ability in an amount of up to 60% by weight, the resulting liquid composition can advantageously be used in the present invention. Addition of the organic polymer compound leads to a decrease in concentration of the metallic elements, with incombustible or fire retardant properties tending to deteriorate. However, in the case where good coating and adhesive properties onto an organic substrate are required, the thermoplastic resin serves to improve adhesion to the substrate.

Further, the liquid composition of the present invention may previously be compounded with a powdery filler (E) such as an activating agent, a filler, a pigment or a colorant generally known in the art and selected for a particular purpose in a proper amount in accordance with its end-use. In particular, use of a colored pigment is necessary with a coating composition and products to be used under user's living environment. In addition, addition of various fillers is necessary for adjusting workability of the liquid composition.

The filler (E) to be used for such purpose is a powdery product having a particle size of, preferably, up to 200μ. Further, water adhered or adsorbed on the powdery filler (E) is preferably removed as much as possible.

Incorporation of a compound containing boric acid, chromic acid or phosphoric acid as an activating agent of filler (E) is effective when the liquid composition is applied to a substrate made of a metal such as iron, since the rust-inhibiting ability of the compound is effectively utilized.

As the curing catalyst (D) for accelerating the above-described cross-linking reaction, metal-containing organic compounds containing a metal such as zinc, cobalt, aluminum or tin are effective. In the present invention, the cross-linking agent (C) of organometallic compound also functions as a curing catalyst as well as a cross-linking agent. Therefore, as is described above, the amount of curing catalyst (D) must be decided in consideration of this point.

The inventor for blocking agents which can block the curing catalyst (D) so as to ensure stable storage of one-pack type composition and enable one to control progress of the curing reaction after application of the composition, and has found that keto-enol type tautomer compounds and alcohols can be effectively used as such blocking agents.

In general, keto-enol type tautomer compounds have the property of being in an equilibrium state between keto form (ethyl β-ketobutyrate) and enol form (ethyl β-hydroxycrotonate). The keto-enol type tautomer compounds seem to exhibit the blocking effect since they undergo chelation based on intramolecular hydrogen bond and difficultly form intermolecular hydrogen bond and scarcely cause intermolecular association.

However, in the presence of a hydroxy group, the blocking is broken, and the metal-containing compound seems to exhibit its catalytic action. When the organosiloxane of the present invention initiates condensation triggered by water, a dealcoholation reaction takes place to produce an alcohol as a by-product in the system. This by-produced alcohol breaks the blocking of the metal element, and the metal element seems to exhibit its catalytic action.

In the present invention, it is also effective to compound a monohydric or polyhydric alcohol in order to retard the curing reaction rate. Though reasons for this fact are not clear, it has been found that the coexistent alcohols depress the progress of the dealcoholation reaction to thereby delay the reaction rate. In this situation, the alcohol does not function as a solvent but functions as a retardant.

An important advantage of the liquid composition of the present invention is that it can be stored in a one-pack state even in the copresence of a curing catalyst. The liquid composition of the present invention may of course be in a two-pack form but, from the viewpoint of ease in application, a one-pack type is desirable.

If R of the group OR in the starting liquid organopolysiloxane includes hydrogen atom, or if the organosiloxane has so-called silanol groups, the OH group of the silanol group causes condensation reaction with coexistent alkoxy groups or the like to eliminate alcohol in the presence of a curing catalyst even in the absence of water, thus the raw liquid composition being polymerized.

Therefore, a composite organosiloxane liquid composition containing a powdery filler (E) such as a colorant or a pigment and containing water or silanol groups must be subjected to a preliminary treatment for removing water or silanol groups in order to avoid progress of the curing reaction during storage.

In the preliminary treatment, the prepared organosiloxane liquid composition or the composite composition is left at a temperature of up to 100° C. to cause reaction between the contained water or silanol groups and copresent alkoxy groups.

The organosiloxane liquid composition of the present invention can find the following applications when cured by exposing to the atmosphere of an ordinary temperature or up to 300° C. together with or without other materials.

(1) A shaped polymer composition in a form of a film, thin sheet, fibers, strand, mass, sphere, square bar or other specific form, formed without other materials.
(2) An adhesive polymer composition to be applied to the surface or interior of various substrates such as a coating or varnish, a protective coating having some thickness, an adhesive, a binder, a joint mixture, amassing or unifying agent for various aggregates, a cementing material, and an anchor-fixing material.
(3) A composite structure unified with a reinforcing material with a form of honeycomb, mass, plate, net, fiber or cloth or with aggregates, moldings or structural products.
(4) A composite sheet unified with a sheet base with a form of film, net, cloth or texture.
(5) A building material formed by applying the siloxane composition to the surface of a building material base such as a metal product (e.g., an iron-made product), a concrete product, a ceramic or clay product, an enamel product, a product of a natural material such as wood or bamboo or a synthetic product thereof.

The aqueous modified organosilicon compound (A) means a compound wherein an organosilicon compound having at least one polyether group bound to the side chain thereof contains dissolved therein water in an amount of up to 50% by weight. The parent organosilicon compound may be any of so-called organosiloxane compounds but, in view of introduction of a polyether group to the side chain, bifunctional organopolysiloxane compounds, called silicone oils, are preferred. In particular, dimethylpolysiloxane, methylphenylpolysiloxane, methylalkylaralkylpolysiloxane and methylepoxypolysiloxane are preferred.

The polyether group to the side chain or at the terminal is based on a linear molecule having the repeating units of [—M—O—] and represented by polyoxymethylene and polyethlene oxide. The most typical example thereof is a polyethylene glycol [HO(CH$_2$CH$_2$O)$_n$H]. In the present invention, bifunctional organopolysiloxane type compounds having an alkoxy group are preferred.

As the parent organosilicon compound to which the polyether group is to be bound may be any of so-called organosiloxane compounds but, in view of ease in modification, bifunctional polysiloxane compounds, called silicone oil are preferred. It does not matter whether these organosilicon compounds have an alkoxy group or not. A typical example of the aqueous modified organosilicon compounds having a polyether group is represented by the following general formula (4) of the basis of dimethylpolysiloxane:

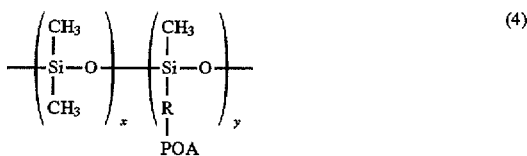

wherein POA represents a polyether group.

Water to be retained in the modified organosilicon compound (A) is fundamentally pure water. However, the water may be an acidic water containing an organic or inorganic acid or salt to a degree of 3 to less than 7 in pH for the purpose of accelerating the dealcoholation reaction and improving adhesion properties to a substrate or rust-inhibiting properties. In addition, the water may be an alkaline water containing a basic element or compound or a salt to a degree of 7 to less than 10 in pH for the purpose of activating the curing catalyst and improving rust-inhibiting properties when applied to the surface of a metal substrate.

As the acid or salt to be added to the water, there are illustrated, for example, inorganic acids such as hydrochloric acid, nitric acid, prussic acid, phosphoric acid, chromic acid and boric acid, organic acids having at least one carboxylic acid, and salts showing some acidity. As the basic element or compound or salt to be added to the water, there are illustrated, for example, alkali metals, alkaline earth metals, ammonia, salts showing some alkalinity, and organic compounds having at least one amino group.

X in the organopolysilicon group (X—Si) of the liquid organopolysiloxane to be used in the present invention is a hydrogen atom or a monovalent hydrocarbyl group having 1 to 5 carbon atoms, and is preferably a straight or branched alkyl group, a fluoroalkyl group, a vinyl group, an allyl group, an alkenyl group, a phenyl group, a xenyl group, a naphthyl group, an aryl group, a cyclohexyl group, a cyclohexenyl group, a benzyl group, an aralkyl group, aralaryl group, an epoxy group, an aminoalkyl group, etc. As the group X, an alkyl group (e.g., methyl or ethyl) and a phenyl group are particularly preferred for obtaining a siloxane polymer composition having excellent heat resistance.

On the other hand, the functional side chain of OR in the liquid organopolysiloxane (B) is important as a site from which the polymerization reaction initiates in the presence of moisture. For this purpose, R in the OR group is preferably a monovalent alkyl group of $C_nH_{2n+1}$, and therefore the OR group is preferably an alkoxy group.

In order to impart enough incombustibility or fire retardance to the siloxane polymer of the present invention and shorten the reaction time, it is necessary to adjust the content of silicon of the organopolysiloxane (B) to a level as high as 50% by weight or more in terms of $SiO_2$. This can be attained by selecting, as liquid organopolysiloxane (B), an oligomer of polymer represented by the general formula (1) wherein n of [—Si—O—]$_n$ moiety is a number of 2 or more.

However, n in the foregoing general formula (1) is preferably less than 15 since a too highly polymerized organopolysiloxane (B) would not be a liquid. Such organopolysiloxanes have a viscosity of not more than 3,000 cps which serves to ensure easy handling of the composition and which eliminates the necessity of dilution with a diluent such as an organic solvent. Thus, the organosiloxane can be independently used without any solvent.

As such organopolysiloxane, that which is constituted by D units having two functional groups or T units having three functional groups or by a combination thereof, and which is a polymer wherein n of the moiety of [—Si—O—]$_n$ is at least 2 is suitable. The upper limit of n may be increased to such degree that the polymer is still in a liquid state. As a general guide, low molecular polysiloxane compounds having a molecular weight of the order of $10^2$ to $10^5$ are preferred.

As to organic side chains (R) including OR of the functional side chain of liquid organopolysiloxane (B), the ratio of R/Si (wherein Si represents Si—O bond) is preferably in the range of from ⅓ to ⅔ from the standpoint of keeping $SiO_2$ content at a high level and allowing the polymerization reaction to effectively proceed to form an intended cured polymer product.

As typical examples of liquid organopolysiloxane (B) favorably used in the present invention, there may be illustrated methylmethoxysiloxane oligomers, organopolysiloxanes of ⅓ to ⅔ in R/Si ratio having alkyl groups fluoroalkyl groups, vinyl group, allyl group, alkenyl groups, phenyl group, xenyl group, naphthyl group, aryl groups, cyclohexyl group, cyclohexenyl group, benzyl group, aralkyl groups, aralaryl groups, epoxy groups, aminoalkyl groups, etc. and, particularly, organopolysiloxanes having methyl or phenyl group, tetramethyl- or ethyl-orthosilicate oligomers, methyl- or vinyltriacetoxysilane oligomers, and the like. These compounds may be used alone or in combination of two or more.

In order to complete a flexible, dense, tough three-dimensional network structure from the liquid organosiloxane composition, it is necessary to form a cross-linkage between intermediate sites of polysiloxane molecules as well as linkage at terminus of polysiloxane molecules. A cross-linking agent (C) which functions to form such a cross-linkage in all directions is necessary for this purpose.

As such cross-linking agent (C), a liquid organic compound of aluminum or boron having the functional group of OR which can react with the silanol group and being represented by the general formula (2) of $[R^7{}_pN(OR^1)_{3-p}]$ or a liquid organic compound of silicon, titanium or zirconium having the functional group of OR which can react with the silanol group and being represented by the general formula (3) of $[R^7{}_mN(OR^1)_{4-m}]$ are effective. In addition, those wherein $R^7$ has a large number of carbon atoms are preferred to obtain good flexibility and and good adhesive properties.

Typical examples of the cross-linking agent (C) are shown below.

As examples of the cross-linking agent represented by the general formula (2) wherein N represents an aluminum element, those organometallic compounds having a trialkoxy group wherein p represents 0 and $R^1$ represents an isopropyl group or a sec-butyl group are preferred. When N represents a boron element, those organometallic compounds having a trialkoxy group wherein p represents 0 and $R^1$ represents a methyl group, an ethyl group or a butyl group are preferred.

When Q in the general formula (3) represents a silicon element, those organometallic compounds wherein $R^7$ represents a methoxy group or an ethoxy group, such as tetramethylorthosilicate, tetraethylorthosilicate, methyltrimethoxysilane, methyltriethoxysilane, vinyltriacetoxysilane, vinyltrimethoxysilane, phenyltrimethoxysilane, γ-glycidoxypropylmethoxysilane, dimethylmethyltrifluoropropylsilane, γ-methacryloxypropyltrimethoxysilane, γ-methacryloxypropylmethyldimethoxysilane, particularly organometallic compounds having an aminoalkyl group such as γ-ureidopropyltriethoxysilane, γ-(2-aminoethyl) aminopropyltriethoxysilane, etc. are preferred for improving the curing effect.

When Q in the general formula (3) represents a titanium element, such organometallic compounds as tetra-i-propyltitanate, tetra-n-butyltitanate, etc. are preferred and, when Q in the general formula (3) represents a zirconium element, such organometallic compounds as tetraethylzirconate, tetra-i-propylzirconate, tetra-n-butylzirconate, etc. are preferred.

These organometallic compounds are preferably in the form of monomers in view of attaining sufficient cross-linking effect, but they may partly be in a polymerized form of dimer or the like. The organometallic compounds may be used alone or in combination of two or more according to the end-use and workability. The cross-linking agent (C) of the present invention is advantageously compounded in the composition in an amount of up to 70% by weight, preferably up to 65% by weight, based on the liquid composition for attaining improved cross-linking effect in the siloxane polymer composition and high flexibility and high adhesion properties of the siloxane polymer composition.

Since the cross-linking agent (C) is an organometallic compound, care must be taken due to the fact that the cross-linking agent functions as a curing catalyst as well as a cross-linking agent. Therefore, the compounding amount of the organometallic compound, particularly, the aluminum-, boron-, titanium- or zirconium-containing organic compound, is desirably limited to up to 25% by weight based on the composition of the present invention, though it depends upon the kind and amount of the curing catalyst (D) of the present invention. The composition containing the cross-linking agent in such an amount shows good one-pack storage properties and sufficient curing rate and facilitates control of the properties of a produced siloxane polymer composition.

In the present invention, a properly selected powdery or flake-like solid silicone resin (SR) may be added to the liquid organopolysiloxane of the present invention for the purpose of properly designing the fundamental skeleton of a produced siloxane polymer composition and adjusting viscosity of the liquid composition to control workability. In this case, however, it is important that the solid silicone resin (SR) is preferably compounded in an amount of up to 30% by weight, preferably up to 25% by weight, in view of attaining the above-described objects and ensuring good workability. However, since such silicone resins (SR) generally contain 3 to 8% by weight of a Silanol group, the liquid composition of the present invention containing the silicone resin to be stored in a one-pack form must be subjected to the preliminary treatment described hereinbefore so as to block the silanol group.

Furthermore, the liquid organopolysiloxane composition of the present invention may contain a thermoplastic resin (HR) for the purpose of improving adhesion to an organic substrate or attaining minor modification as a coating composition. As the thermoplastic resin (HR), linear organic high molecular compounds having acyl groups and being soluble in a liquid organosiloxane are preferred. Examples thereof include resins such as an acrylic resin, a polystyrene resin, a polyethylene resin, a polyvinyl chloride resin, cellulose, etc. and derivatives thereof and copolymers with an unsaturated carboxylic acid produced in a non-aqueous solvent. Monomers include, for example, ethylene, propylene, butadiene, isoprene, chloroprene, styrene, vinyl acetate, vinyl propionate, vinyl ether, vinyl chloride, vinylidene chloride, methyl or ethyl acrylate and an acrylic ester, and the unsaturated carboxylic acid include, for example, acrylic acid, methacrylic acid, crotonici acid, itaconic acid and maleic anhydride.

These thermoplastic resins (HR) are preferably compounded in an amount of up to 60% by weight, preferably up to 55% by weight, for attaining the above-described objects and ensuring good workability.

In the organosiloxane composition of the present invention may be compounded a filler (E) selected from the group consisting of a powdery activating agent, filler, pigment or colorant having a size of up to 200 microns according to particular properties, functions, workability, end-use, etc. of the cured siloxane polymer composition. These fillers (E) may be compounded in amounts not spoiling the workability and properties of the organosiloxane composition. One or more of the fillers may be added in amounts of 1 to 500 parts by weight, preferably 1 to 400 parts by weight, per 100 parts by weight of the organosiloxane liquid composition.

As to compounding stage, the fillers are preferably compounded before addition of the curing catalyst (D). When the fillers (E) contain moisture or OH groups, it is important to subject them to a treatment for removing the moisture or OH groups, such as a drying treatment or the preliminary treatment specified in the present invention. Examples of the powdery fillers (E) are illustrated below.

As the activating agents of fillers (E), powdery products of a boric acid-containing compound, a chromic acid-containing compound and a phosphoric acid-containing compound or modified or processed products may be employed. The organosiloxane composition containing therein the activating agent tends to show an improved adhesive properties to, for example, a substrate of metal such as iron to expect good corrosion resistance.

As the fillers of fillers (E), proper one may be selected from among powders of metal or alloy, oxide powders containing silicon or aluminum as a major component, powders of alkaline earth metal, glazing compositions having various formulations, and powders of up to 200 microns in size selected from powders of talc, mica or fly ash.

As the pigments of fillers (E), inorganic colored pigments such as titanium dioxide and red iron oxide, baked pigments composed of metal, alloy or oxide or non-oxide, inorganic functional pigments, and organic pigments may be used depending upon the end-use.

As the colorants of fillers (E), the above-described inorganic pigments may also be used but, since the organosiloxane of the present invention has organic groups, organic pigments and dyes known and widely used in the art may be used alone or in combination.

The above-described fillers (E) may be used alone or in combination of two or more in full consideration of size distribution, shape, pore volume, specific surface area, water absorption capacity, oil absorption capacity, etc. suited for the particular end-use of the organosiloxane composition. Fillers of desired properties can be obtained by drying, grinding, classification, mixing, baking, purification or like procedure. These powdery fillers (E) may have been surface-treated with a coupling agent or a surfactant depending upon desired workability and the end-use.

The curing catalyst (D) to be used in the present invention is preferably selected from the group consisting of organometallic compounds containing zinc, cobalt, aluminum or tin and mixtures thereof. Needless to say, care must be taken to the point that, as is described above, the cross-linking agent (C) of titanium- or zirconium-containing organic compound also functions as a curing catalyst. Specific examples of the metal-containing curing catalyst (D) are illustrated below. That is, known general curing catalysts such as zinc naphthenate, cobalt octate, cobalt naphthenate, aluminum trimethoxide, aluminum di- or tris(acetylacetonate), aluminum tri-n-butoxide, diacetyltin diacetate, dibutyltin dilaurate, dibutyltin diacetate, dioctyltin dilaurate, diacetyltin dioxtoate and tin octate may be used.

A typical example of the blocking agent is ethyl acetoacetate, which is preferably used in the present invention. Other examples of the keto-enol tautomer compound include malonic acid diesters, $\beta$-diketones (e.g., acetylacetone), benzoylacetone, dibenzoylmethane, ketones having a hydroxyl group in $\beta$-position (e.g., diacetonealcohol), esters having a hydroxyl group at $\beta$-position (e.g., methyl salicylate), and derivatives of the above-described compound wherein said alkyl group is constituted by a trifluoro group.

The amount of the keto-enol tautomer compound varies depending upon the kind and amount of the curing catalyst (D) and during conditions, but can easily be determined by conducting simple experiments. As a general guide, the tautomer compound is compounded in an amount of up to 50% by weight in the curing catalyst to obtain effective blocking effect.

Examples of the reaction-retarding monohydric or polyhydric alcohols capable of controlling the curing reaction include monohydric alcohols such as methyl alcohol, ethyl alcohol, propyl alcohol, butyl alcohol, amyl alcohol, etc. and polyhydric alcohols such as ethylene glycol, glycerin, erythritol, etc.

The amount of the alcohol to be used for retarding the condensation reaction varies depending upon the kind and amount of the curing catalyst (D), curing condition and degree of retarding the reaction, but can easily be determined by conducting simple examples. As a general guide, the alcohol is previously compounded in the curing catalyst (D) in an amount of up to 50% by weight for not spoiling the catalytic action of the curing agent. In the case of using the above-described blocking agent of keto-enol tautomer compound and the reaction-retarding agent of alcohol in combination, their total amount is preferably up to 50% by weight based on the curing catalyst (D).

The amount of the curing catalyst (D) blocked with the keto-enol tautomer compound, the amount of the curing catalyst (D) compounded with the reaction-retarding alcohol, or the amount of the curing catalyst (D) independently used varies depending upon content, kind and amount of the liquid organopolysiloxane (B) or the cross-linking agent (C) or upon content and kind of the curing catalyst (D). In general, however, the curing catalyst is used in an amount of 0.1 to 10.0% by weight. Particularly when an aluminum-, boron-, titanium- or zirconium-containing organometallic compound is used as the cross-linking agent (C), the amount of the curing catalyst (D) may be minimized.

In the present invention, R of group OR in the organopolysiloxane (B) may be a hydrogen atom. As has been described hereinbefore, however, it is necessary, when the hydrogen atom constitutes a silanol group (OH group), the organopolysiloxane must previously be subjected to the preliminary treatment together with the cross-linking agent (C) so as to ensure one-pack storage stability of the liquid composition. Employment of the preliminary treatment is also important in the case of using a silicone resin, a thermoplastic resin or a filler (E) in combination.

The preliminary treatment is completed by maintaining the liquid organopolysiloxane (B), cross-linking agent (C), silicone resin (SR), thermoplastic resin (HR), or powdery filler (D) alone or in combination at a temperature of ordinary temperature to up to 100° C. for at least 5 minutes, preferably at least 8 minutes in the absence of water under stirring or being left to stand. In the case of employing an ordinary temperature, 24-hour treatment is sufficient. This treatment causes dealcoholation reaction between silanol group and alkoxy or acyloxy group to remove the silanol groups. A filler (E) having a large amount of water is preferably subjected to a dehydrating treatment such as heating prior to the preliminary treatment to thereby remove most of contained water.

The mixed or composite composition of the present invention comprising the aqueous modified organosilicon compound (A), the liquid organopolysiloxane (B), cross-linking agent (C), curing catalyst (D) and, if necessary, powdery filler (E) initiates the curing reaction when brought into contact with water. Moisture in the atmosphere is sufficient for the initiation of the reaction, but the composition may positively be brought into contact with water. To bring the composition into contact with water may be conducted at ordinary temperature or under heating up to 300° C., preferably up to 270° C. and under pressure or degassing conditions. If necessary, it may be conducted under reduced pressure or in an atmosphere of inert gas such as a nitrogen gas.

When the mixed or composite composition of the present invention comprising the aqueous modified organosilicon compound (A), the liquid organopolysiloxane (B), cross-linking agent (C), curing catalyst (D) and, if necessary, powdery filler (E) is exposed to moisture-containing atmosphere by maintaining it in a specific shape, applying it to the surface of a substrate, impregnating it into a substrate or by unifying it with various materials, no harmful materials such as organic solvents are allowed to diffuse into the working environment, and when the cured polymer product is subjected to combustion, no harmful and poisonous gases are produced. Thus, the composition of the present invention can be safely used without polluting the environment of the earth.

The organosiloxane compositions of the present invention may previously be compounded with surfactants, fluorine-containing compounds having high surface activity, various organic compounds, resins and, if necessary, organic solvents in amounts keeping the content of $MO_{y/2}$ within the scope of the present invention for the purpose of improving workability etc.

When used as a kind of binder, the liquid organosiloxane composition of the present invention can provide a, composite cured product or structure wherein reinforcing agents in a form of honeycomb, mass, plate, net, fiber, cloth, or the like, aggregates, moldings, structural piece, etc. are unified to obtain desired performances, functions, etc. adapted for a particular end-use.

As the aggregates, reinforcing agents or moldings to be preferably used for the above-described purposes, there may be used those powders which have a comparatively large size of 200 microns or more or which are selected from the following materials in amounts of not spoiling the work ability and favorable properties of the composition, generally 100 to 2,000 parts by weight per 100 parts by weight of the organosiloxane composition.

As the preferable reinforcing agents, aggregates or moldings having a particle size of 200 microns or more, there may be used, for example, various aggregates of silica, alumina, zirconia, various micas, asbestos, flake-like metal powder, etc.

Further, various synthetic light-weight aggregates and powdery or granular artificial aggregates produced from industrial waste may be used. Still further, vegetable fibers, flake-like or fibrous metals, inorganic fibers such as glass fibers, natural mineral fibers, and fibrous reinforcing materials or moldings such as texture, net, mat, woven fabric, nonwoven fabric, etc. of organic fibers may also be used. Yet further, honeycomb moldings formed by using the above-described aggregates or the like may also be employed.

According to one aspect of the present invention, a composite sheet can be formed by applying the organosiloxane liquid composition of the present invention to a sheet base such as a film, net, cloth or texture made of various materials such as natural materials, synthetic materials, minerals, glasses or ceramics, and curing the composition.

According to another aspect of the present invention, building materials of various sizes can be produced by applying the organosiloxane composition of the present invention to the surface of various building material bases such as metal products made of, for example, iron, concrete products, products of ceramics or clays, products of wood, bamboo or other natural materials or synthetic-products thereof.

The formulation and preparation of the aqueous organosiloxane liquid composition of the present invention, properties of the prepared liquid composition, and use of the siloxane polymer composition formed by exposing the liquid composition to the atmosphere at temperatures up to 300° C. are described below by reference to the following Examples which, however, are not to be construed as limiting the present invention in any way. Additionally, starting materials and prepared materials employed in this Example are abbreviated as follows. That is, the aqueous modified organosilicon compound (A) is abbreviated as "OS-W", the liquid organopolysiloxane (B) as "OS-P", the cross-linking agent (C) as "OS-B", the mixed liquid composition of the liquid organopolysiloxane (B) and the optional resin as "OS-PR", the binary mixture liquid composition of "OS-PR" and the cross-linking agent (C) as "OS-PB", and the solvent-free, one-pack type aqueous organosiloxane liquid composition composed of four components as "OS liquid composition".

Additionally, "%" and "parts" are by weight unless otherwise specified.

EXAMPLE 1

I Starting materials, preparation and formulation of the liquid composition of the present invention (OS liquid composition)

1) Aqueous modified organosilicon compound (A) (OS-W)

The organosilicon compound having at least one polyether group as side chain are selected as follows. The side chain polyether group is derived from a polyethylene oxide represented by the general formula of $HO(CH_2CH_2O)_nH$ (4), which is also referred to as polyethylene glycol. The parent organosilicon compound is dimethylpolysiloxane or its derivative partly modified with an epoxy group or a phenyl group. To these polyether-having modified organosilicon compounds (modified silicone oils) were added water, an acidic water or an alkaline water in a predetermined amount, and the resulting mixtures were slightly stirred at an ordinary temperature to prepare 6 kinds of the aqueous modified organosilicon compounds (A). Additionally, the acidic water was an aqueous solution of boric acid having a pH of 5.5, and the alkaline water was an aqueous solution of potassium hydroxide having a pH of 8.0.

Formulations and $SiO_2$ content (%) of the aqueous modified organosilicon compounds (A) are tabulated in Table 1.

TABLE 1

| Symbol | Starting Material (product name*) | Water Kind | Water (%) | SiO2 (%) |
|---|---|---|---|---|
| SW-1 | Polyether-modified dimethylpolysiloxane (SH3746) | Water | 20.0 | 24.7 |
| SW-2 | Polyether-modified dimethylpolysiloxane (SH3746) | Water | 45.0 | 17.0 |
| SW-3 | Polyether- and epoxy-modified dimethyl-polysiloxane (SF8421) | Water | 20.0 | 20.5 |
| SW-4 | Polyether- and aralkyl-modified dimethyl-polysiloxane (SF8419) | Water | 20.0 | 19.2 |
| SW-5 | Polyether-modified dimethylpolysiloxane (SH3746) | Acidic Water pH 5.5 | 20.0 | 24.7 |
| SW-6 | Polyether-modified dimethylpolysiloxane (SH3746) | Alkaline Water pH 8.0 | 20.0 | 24.7 |

*Product name of modified silicone oils manufactured by Toray Dow-Corning Silicone All of these aqueous modified organosilicon compounds (A) did not separate into two or more portions or denatured but kept their homogeneous state even after being allowed to stand for 6 months at room temperature.

2) Starting siloxane materials of liquid organopolysiloxane (B) (OS-P) and silicon contents thereof ($SiO_2$ %) are shown in Table 2.

TABLE 2

| Symbol | Compound Name | $SiO_2$ (%) | Manufacturer[a] and Trade Name |
|---|---|---|---|
| SL-MF1 | Methyl - and phenyl-containing low molecular silicone | 55.7 | TD: DC 3037 |
| SL-MF2 | Methyl- and phenyl-containing low molecular silicone | 53.5 | TD: DC 3074 |
| SL-MF3 | Methyl- and phenyl-containing low molecular silicone | 53.0 | TD: Trial sample |
| SL-F | Phenyl-containing low molecular silicone | 63.5 | SS: KR 217 |
| SL-M | Methyl-containing low molecular silicone | 66.3 | TD: SR 2402 |
| SL-MFR | Methyl- and phenyl-containing high molecular liquid silicone resin | 72.8 | TD: SR 2414 |
| SL-MD | Methyltriethoxy-silane oligomer | 53.1 | TD: Trial sample |
| SL-MSO | Methyl silicate oligomer | 51.0 | TM: M-51 |
| SL-ESO | Ethyl silicate oligomer | 54.0 | TM: Trial sample |

[a]Manufacturer
TD: Toray Dow-Corning Silicone
SS: Shin-etsu Kagaku Kogyo
TM: Tama Kagaku Kogyo 3) Materials for cross-linking agent (C)(OS-B) and metal component content thereof ($MO_{y/2}$ %) are shown in Table 3.

TABLE 3

| Symbol | Compound Name | $MO_{y/2}$ (%) | Manufacturer[b] and Trade Name |
|---|---|---|---|
| B-ASB | Aluminum tri-sec-butyrate | 20.7 | DC: ASB |
| B-TMB | Trimethoxy borate | 33.5 | KK: TMB |
| B-MTM | Methyltrimethoxy-silane | 44.1 | SS: KBM 13 |
| B-MTE | Methyltriethoxy-silane | 33.6 | SS: KBE 13 |
| B-HTE | Hydroxypropyltri-ethoxysilane | 28.5 | TD: AY43-024 |
| B-DMDM | Dimethyldi-methoxysilane | 49.9 | TD: AY43-004 |
| B-CPDM | Methacryloxy-propylmethyldi-methoxysilane | 29.5 | TD: AY43-060 |
| B-FTM | Phenyltrimethoxy-silane | 30.2 | TD: AY43-040 |
| B-FTE | Diphenyldimethoxy-silane | 24.6 | TD: AY43-047 |
| B-GTM | Glycidoxypropyl-trimethoxysilane | 25.4 | TD: SH 6040 |
| B-APE | Aminopropyltri-ethoxysilane | 27.1 | SS: KBE903 |
| B-AUE | Ureidopropyltri-ethoxysilane | 22.7 | TD: AY43-031 |
| B-FFM | Trifluorotri-methoxysilane | 39.4 | TD: Trial sample |
| B-TBT | Tetra-n-butoxy-titanium oligomer | 23.5 | NS: B-4 |
| B-TPT | Tetra-i-propoxy-titanium | 28.2 | NS: TPT |
| B-TBZ | Tetra-n-butoxy-zirconium | 22.6 | NS: TBZ |

[b]Manufacturer
TM: Tama Kagaku Kogyo
DC: Daihachi Kagaku
NS: Nihon Soda
TD: Toray Dow-Corning Silicone
KK: Koriyama Kasei
SS: Shin-etsu Kagaku Gogyo
CM: Commercially available product 4) Solid silicone resins and solid thermoplastic resins are tabulated in Table 4 together with the silicon content ($SiO_2$ %).

TABLE 4

| Symbol | Name of Compound | $SiO_2$ (%) | Manufacturer[c] and Trade Name |
|---|---|---|---|
| SR-MF1 | Methyl- and phenyl-containing high molecular flake-like silicone resin | 51.4 | TD: SH 6018 |
| SR-MF2 | Methyl- and phenyl-containing high molecular powder like silicone resin | 55.6 | TD: DC6-2230 |
| OR-AC | Low molecular weight acrylic resin | 0 | MR: BR-101 |
| OR-EP | Low molecular weight polyester resin | 0 | MR: Trial sample |

[c]Manufacturer
TD: Toray Dow-Corning Silicone
MR: Mitsubishi Rayon

5) Binary intermediate liquid compositions (OS-PB) composed of the liquid organopolysiloxane (B)(OS-P), optionally containing the resin shown in Table 4, and the cross-linking agent (C)(OS-B) were prepared. Formulations, $MO_{y/2}$ content (%), and preliminary treatment conditions of the binary mixture are shown in Table 5.

Additionally, since all of the resins are in a solid state, they must be dissolved for preparing the liquid composition of the present invention. Therefore, the organopolysiloxanes shown in Table 5 were utilized as solvents, and the resins are once completely dissolved therein to prepare OS-PR samples, followed by compounding the samples with the cross-linking agent (C)(OS-B) to thereby prepare OS-PB samples.

In the case of compounding a thermoplastic resin, the cross-linking agent (C) is also used as a part of the solvent to prepare a homogeneous composition.

TABLE 5

| Sample No. | Formulation of OS-P Composition and Resin | | Cross-linking Agent (OS-B) | | $MO_{y/2}$ (%) | Preliminary Treatment | |
|---|---|---|---|---|---|---|---|
| | Content | wt % | Content | wt % | | °C. | hrs |
| PB-1 | SL-MF1 | 30 | B-FTM | 25 | 49.0 | 20 | 48 |
| | SL-MF2 | 30 | B-CPDM | 2 | | | |
| | SL-MFR | 10 | B-TBT | 1 | | | |
| | | | B-ASB | 1 | | | |
| | | | B-TMB | 1 | | | |
| PB-2 | SL-MFR | 5 | B-FTM | 10 | 48.9 | 26 | 24 |
| | SL-MF2 | 35 | B-MTM | 8 | | | |
| | SL-M | 10 | B-GTM | 8 | | | |
| | SL-MSO | 15 | B-CPDM | 3 | | | |
| | SL-ESO | 5 | B-TPT | 1 | | | |
| PB-3 | SL-MF2 | 15 | B-FTM | 9 | 51.9 | 25 | 24 |
| | SL-F | 30 | B-GTM | 5 | | | |
| | SR-MF1 | 30 | B-FFM | 7 | | | |
| | | | B-TBZ | 4 | | | |
| PB-4 | SL-MF3 | 45 | B-FTM | 33 | 39.5 | 20 | 48 |
| | | | B-HTE | 8 | | | |
| | | | B-AUE | 12 | | | |
| | | | B-TMB | 2 | | | |
| PB-5 | SL-MF2 | 20 | B-FTM | 15 | 58.1 | 40 | 18 |
| | SL-M | 25 | B-DMDM | 3 | | | |
| | SL-MFR | 25 | B-TBZ | 1 | | | |
| | SR-MF2 | 10 | B-TMB | 1 | | | |
| PB-6 | SL-MF3 | 30 | B-FTM | 35 | 39.1 | 10 | 72 |
| | SL-MF1 | 10 | B-FTEM | 15 | | | |
| | | | B-AUE | 10 | | | |
| PB-7 | SL-MF2 | 33 | B-MTE | 9 | 38.2 | 60 | 10 |
| | | | B-FTM | 46 | | | |
| | | | B-GTM | 10 | | | |
| | | | B-TBT | 2 | | | |
| PB-8 | SL-MF1 | 20 | B-BTA | 10 | 36.6 | 80 | 6 |
| | SL-M | 6 | B-FTM | 46 | | | |
| | SL-MSO | 5 | B-TPT | 3 | | | |
| | SR-MF1 | 5 | B-TMB | 5 | | | |
| PB-9 | SL-MF2 | 30 | B-CPDM | 20 | 38.9 | 20 | 48 |
| | SL-MF3 | 10 | B-FTM | 30 | | | |
| | | | B-AUE | 10 | | | |
| PB-10 | SL-MF2 | 30 | B-CPDM | 12 | 38.7 | 25 | 24 |
| | SR-MF2 | 5 | B-FFM | 3 | | | |
| | | | B-FTM- | 50 | | | |
| PB-11 | SL-MF2 | 25 | B-MTED | 3 | 33.8 | 20 | 48 |
| | OR-AC | 10 | B-DMDM | 4 | | | |
| | | | B-GTM | 12 | | | |
| | | | B-FTM | 40 | | | |
| | | | B-TBT | 3 | | | |
| | | | B-TMB | 5 | | | |
| PB-12 | SL-MF2 | 20 | B-FTM | 43 | 28.7 | 20 | 48 |
| | SR-MD | 2 | B-CPDM | 10 | | | |
| | OR-EP | 20 | B-TBZ | 5 | | | |
| PB-13 | SL-MFR | 33 | B-FTM | 4 | 29.9 | 25 | 24 |
| | OR-AC | 52 | B-MTM | 10 | | | |
| | | | B-TBT | 1 | | | |
| PB-14 (Comparative Ex.) | SL-MF3 | 10 | B-FTM | 28 | 19.9 | 25 | 24 |
| | OR-AC | 37 | B-GTM | 20 | | | |
| | | | B-ASB | 5 | | | |

6) Metal-containing organic compounds for the curing catalyst (D), blocking agents, and reaction retardants used in this Example (each selected from commercially available products) are shown in Table 6.

TABLE 6

| | $MO_{y/2}$ (wt %) | Symbol |
|---|---|---|
| Chemical name of curing catalyst | | |
| Zinc naphthenate | 32.5 | C-Zn |
| Cobalt octate | 21.7 | C-Co |
| Aluminum tri-n-butoxide | 41.6 | C-BA1 |
| Tris(acetylacetonato)aluminum | 37.0 | C-AA1 |
| Dibutyltin dilaurate | 23.9 | C-SnB |
| Dibutyltindiacetate | 42.9 | C-SnA |
| Chemical name of blocking agent | | |
| Ethyl acetoacetate | 0 | CB-AAE |
| Malonic acid diester | 0 | CB-ME |
| Benzoylacetone | 0 | CB-BA |
| Ethyl trifluoroacetate | 0 | CB-FAE |
| Chemical name of retardant | | |
| Methyl alcohol | 0 | CD-MA |
| Isobutanol | 0 | CD-IB |
| Ethyleneglycol | 0 | CD-EG |
| Glycerin | 0 | CD-GL |

7) Formulations of complex curing catalyst (D) wherein the metal-containing organic compound, blocking agent and reaction retardant are combined are given in Table 7.

TABLE 7

| Sample No. | Metal-containing Organic Compound | | Blocking Agent | | Reaction Retardant | | $MO_{y/2}$ (%) |
|---|---|---|---|---|---|---|---|
| | Kind | wt % | Kind | wt % | Kind | wt % | |
| C-1 | C-Zn | 50 | CB-AAE | 50 | — | — | 16.2 |
| C-2 | C-Co | 50 | CB-AAE | 50 | — | — | 10.9 |
| C-3 | C-BA1 | 50 | CB-AAE | 50 | — | — | 20.8 |
| C-4 | C-AA1 | 50 | CB-AAE | 50 | — | — | 18.5 |
| C-5 | C-SnA | 80 | CB-AAE | 20 | — | — | 34.3 |
| C-6 | C-SnB | 60 | CB-ME | 40 | — | — | 25.3 |
| C-7 | C-SnA | 60 | CB-BA | 40 | — | — | 25.7 |
| C-8 | C-SnA | 60 | CB-FAE | 40 | — | — | 25.7 |
| C-9 | C-SnB | 70 | — | — | CD-MA | 30 | 16.7 |
| C-10 | C-SnA | 80 | — | — | CD-EG | 20 | 34.3 |
| C-11 | C-SnA | 90 | — | — | CD-GL | 10 | 38.6 |
| C-12 | C-SnA | 65 | CB-AAE | 25 | CD-IB | 10 | 27.9 |
| C-13 | C-SnA | 55 | — | — | CD-IB | 25 | 32.9 |
| | C-AA1 | 25 | | | | | |

EXAMPLE 2

II Aqueous organosiloxane liquid compositions and siloxane polymer compositions

Aqueous organosiloxane liquid composition samples were prepared from the OS-PB composition containing the aqueous organosilicon compound (A), liquid organopolysiloxane (B), resin-containing liquid composition and cross-linking agent (C) and the curing catalyst (D). Formulations thereof are shown Table 8.

For comparison to clarify the advantages of the present invention, the following samples were prepared: a liquid composition not containing the aqueous modified organosilicon compound (sample No. H-1); a liquid composition containing metal elements in a content of not more than 20% by weight in terns of $MO_{y/2}$ (sample No. H-2); a binary liquid composition not containing the cross-linking agent (sample No. H-3); and a general-purpose, commercially available coating composition prepared from an acrylic organic resin (sample No. H-4).

Uniformly curing properties of the thus prepared liquid composition samples were tested according to the following testing method, and surface hardness of siloxane polymer compositions obtained by subjecting them to the curing conditions (temperature and time) were tested according to the following testing method. Results thus obtained are also shown in Table 8.

Testing methods:

(1) Uniformly curing properties

A liquid composition sample was placed in an open vessel of 30mm (diameter)×5 mm (depth) to the brim, and was left at room temperature for one week. Then, the cured sample of 30 mm (diameter)×5 mm (depth) was taken out of the vessel, and hardness of the surface and the back of the cured sample was measured in terms of pencil hardness. Samples showing no difference in hardness between the surface and the back were evaluated as showing uniform curing (◎), and samples showing some difference in hardness between the surface and the back were evaluated as showing nonn-uniform curing (X).

(2) Preparation of coated test samples

A liquid composition sample was spray-coated in a thickness of about 30 microns on a 4-mm thick steel plate described in JIS G 3141 according to the general testing method described in JIS K 5400, followed by filming and curing the coated composition under the curing conditions shown in Table 8.

(3) Surface hardness (pencil hardness)

The coated sample was subjected to the pencil-scratching testing method described in JIS K 5400, 6.14. Results thus obtained were rated in terms of pencil hardness.

(4) Heat resistance

The coated test samples were placed in a 250° C. electrical furnace for 24 hours, then taken out of the furnace. Test samples suffering no abnormality such as cracks and change in color were scored as having "good" heat resistance, and samples suffering the abnormality were scored as having "bad" heat resistance.

(5) Adhesion properties

Coated samples were subjected to the peeling test according to the testing method of making cuts crosswise in the coat film described in JISK 5400. Samples showing the results of 25/25 were scored as having "good" adhesion properties, and samples showing worse results were scored as having "bad" adhesion properties.

TABLE 8

| Sample No. | Aqueous Organosiloxane Liquid Composition | | | | | | *1 | Curing Conditions (°C.) × (h) | *2 | *3 | *4 |
|---|---|---|---|---|---|---|---|---|---|---|---|
| | OS-W No. | wt % | OS-P No. | wt % | *5 No. | wt % | | | | | |
| S-1 | SW-1 | 5 | PB-1 | 90 | C-5 | 5 | ◎ | 25 × 72 | 3H | good | good |
| S-2 | SW-1 | 5 | PB-2 | 90 | C-5 | 5 | ◎ | 25 × 72 | 3H | good | good |
| S-3 | SW-1 | 5 | PB-3 | 90 | C-5 | 5 | ◎ | 25 × 72 | 4H | good | good |
| S-4 | SW-1 | 5 | PB-4 | 90 | C-5 | 5 | ◎ | 25 × 72 | 4H | good | good |
| S-5 | SW-1 | 5 | PB-5 | 90 | C-5 | 5 | ◎ | 25 × 72 | 4H | good | good |
| S-6 | SW-1 | 5 | PB-6 | 90 | C-5 | 5 | ◎ | 25 × 72 | 3H | good | good |
| S-7 | SW-1 | 5 | PB-7 | 90 | C-5 | 5 | ◎ | 25 × 72 | 3H | good | good |
| S-8 | SW-1 | 5 | PB-B | 90 | C-5 | 5 | ◎ | 25 × 72 | 3H | good | good |
| S-9 | SW-1 | 5 | PB-9 | 90 | C-5 | 5 | ◎ | 25 × 72 | 3H | good | good |
| S-10 | SW-1 | 5 | PB-10 | 90 | C-5 | 5 | ◎ | 25 × 72 | 3H | good | good |
| S-11 | SW-1 | 5 | PB-11 | 90 | C-5 | 5 | ◎ | 25 × 72 | 3H | good | good |
| S-12 | SW-1 | 5 | PB-12 | 90 | C-5 | 5 | ◎ | 25 × 72 | 2H | good | good |
| S-13 | SW-1 | 5 | PB-13 | 90 | C-5 | 5 | ◎ | 25 × 72 | 2H | good | good |
| S-14 | SW-2 | 5 | PB-6 | 90 | C-5 | 5 | ◎ | 25 × 72 | 3H | good | good |
| S-15 | SW-3 | 5 | PB-6 | 90 | C-5 | 5 | ◎ | 25 × 72 | 3H | good | good |
| S-16 | SW-4 | 5 | PB-6 | 90 | C-5 | 5 | ◎ | 25 × 72 | 3H | good | good |
| S-17 | SW-5 | 5 | PB-6 | 90 | C-5 | 5 | ◎ | 25 × 72 | 3H | good | good |
| S-18 | SW-6 | 5 | PB-6 | 90 | C-5 | 5 | ◎ | 25 × 72 | 3H | good | good |
| S-19 | SW-1 | 3 | PB-4 | 87 | C-1 | 10 | ◎ | 120 × 0.4 | 4H | good | good |
| S-20 | SW-1 | 3 | PB-4 | 87 | C-2 | 10 | ◎ | 120 × 0.4 | 4H | good | good |
| S-21 | SW-1 | 3 | PB-4 | 87 | C-3 | 10 | ◎ | 120 × 0.4 | 4H | good | good |
| S-22 | SW-1 | 3 | PB-4 | 87 | C-4 | 10 | ◎ | 120 × 0.4 | 4H | good | good |
| S-23 | SW-1 | 5 | PB-4 | 90 | C-6 | 5 | ◎ | 120 × 0.4 | 4H | good | good |
| S-24 | SW-1 | 5 | PB-4 | 90 | C-7 | 5 | ◎ | 120 × 0.4 | 4H | good | good |
| S-25 | SW-1 | 5 | PB-4 | 90 | C-8 | 5 | ◎ | 120 × 0.4 | 4H | good | good |
| S-26 | SW-1 | 5 | PB-4 | 90 | C-9 | 5 | ◎ | 120 × 0.4 | 4H | good | good |
| S-27 | SW-1 | 5 | PB-4 | 90 | C-10 | 5 | ◎ | 120 × 0.4 | 4H | good | good |
| S-28 | SW-1 | 5 | PB-4 | 90 | C-11 | 5 | ◎ | 120 × 0.4 | 4H | good | good |
| S-29 | SW-1 | 5 | PB-4 | 90 | C-12 | 5 | ◎ | 120 × 0.4 | 4H | good | good |
| S-30 | SW-1 | 5 | PB-4 | 90 | C-13 | 5 | ◎ | 120 × 0.4 | 4H | good | good |
| S-31 | SW-1 | 10 | PB-4 | 85 | C-13 | 5 | ◎ | 25 × 72 | 2H | good | good |
| S-32 | SW-1 | 15 | PB-4 | 80 | C-13 | 5 | ◎ | 25 × 72 | H | good | good |
| S-33 | SW-1 | 5 | PB-6 | 90 | C-13 | 5 | ◎ | 160 × 0.2 | 4H | good | good |
| S-34 | SW-1 | 5 | PB-6 | 90 | C-13 | 5 | ◎ | 180 × 0.1 | 4H | good | good |
| S-35 | SW-1 | 5 | PB-9 | 90 | C-13 | 5 | ◎ | 25 × 48 | 2H | good | good |
| H-1 | — | | PB-1 | 95 | C-12 | 5 | X | 25 × 72 | HB | good | good |
| H-2 | SW-1 | 5 | PB-14 | 90 | C-12 | 5 | ◎ | 25 × 72 | B | good | bad |
| H-3 | SW-1 | 5 | SL-MF1 | 90 | C-12 | 5 | — | 25 × 72 | — | | |
| H-4 | commercially available acrylic enamel coating composition | | | | | | — | 25 × 72 | 2H | good | bad |

It can be seen, from the above-described results, that the aqueous organosiloxane liquid composition of the present invention has uniformly curing properties and, when exposed to the atmosphere of up to 300° C., can rapidly form a siloxane polymer composition having sufficient surface hardness, adhesion properties and heat resistance, thus the objects of the present invention being attained.

On the other hand, the liquid composition not containing the aqueous modified organosilicon compound has no uniformly curing properties, and it took at least 144 hours to attain the surface hardness of H in pencil hardness. The liquid composition not containing the cross-linking agent was not cured at all even after being left for a long period of time (one week) at ordinary temperature, thus no film being formed. Samples having $MO_{y/2}$ content of up to 20% by weight, films having sufficient heat resistance were not obtained. The commercially available organic resin-containing coating composition showed no heat resistance and, when exposed to the atmosphere of 450° C., it burnt with giving off a bad smell and black smoke.

EXAMPLE 3

III Application as a shaped polymer composition

A liquid composition selected from the aqueous organosiloxane liquid compositions (OS liquid compositions) shown in Table 8 was independently kept in a shape of film or filament to produce a siloxane cured product.

Application as a thin film:

A liquid composition selected from the OS liquid compositions shown in Table 8 was cast in a thickness of about 50 microns on a plasticizer-containing, soft polyvinyl chloride plate, was allowed to stand for 48 hours at room temperature to form a thin film sample.

Application as a filament:

A liquid composition selected from the OS liquid compositions shown in Table 8 was cast in a thickness of about 10 microns on the surface of water contained in a vessel, and was allowed to stand for 3 hours at room temperature to permit partial polymerization in a thin film state, and the cast composition having an increased viscosity was taken upward to form a flament of about 0.1 mm$\phi$ in thickness. This filament was then passed through a heating station kept at about 200° C. to form a cured filament sample.

The thus obtained thin film sample and the filament sample were subjected to the following heat resistance test and flexibility test. The thus obtained results are also shown in Table 9.

Testing method:

(4) Heat resistance

Each sample was placed in a 220° C. electrical furnace for 24 hours, then taken out of the furnace. Test samples suffering no abnormality such as contraction, breakage, melting and change in color were scored as having "good" heat resistance, and samples suffering the abnormality were scored as having "bad" heat resistance.

(5) Flexibility

Each sample was wound around a 3-mm$\phi$ shaft. Samples not suffering tear or breakage and showing no abnormality when unwound were scored as having "good" flexibility, and samples suffering the abnormality were scored as having "bad" flexibility.

TABLE 9

| Sample No. | OS Composition | Thin Film | | Filament | |
|---|---|---|---|---|---|
| | | Heat Resistance | Flexibility | Heat Resistance | Flexibility |
| M-1 | S-3 | good | good | — | — |
| M-2 | S-1 | — | — | good | good |
| M-3 | S-4 | good | good | — | — |
| M-4 | S-6 | — | — | good | good |
| M-5 | S-9 | good | good | — | — |
| M-6 | S-10 | — | — | good | good |
| M-7 | S-11 | good | good | — | — |
| M-8 | S-12 | — | — | good | good |
| M-9 | S-13 | good | good | good | good |

It can be seen, from the above results, that the aqueous organosiloxane composition of the present invention forms, when exposed to the atmosphere at temperatures up to 300° C., a film or a filament of cured siloxane polymer composition having good heat resistance and good flexibility.

EXAMPLE 4

IV Application as an adhesive polymer composition

According to this application, a liquid composition selected from the aqueous organosiloxane liquid compositions (OS liquid compositions) shown in Table 8 was cured under the following conditions to form a siloxane cured product independently or together with a filler (E) or the like. Specific applications as an adhesive polymer composition in the form of a coating or a binder are illustrated below.

IV-1 Application as transparent film:

A sample liquid composition was coated on a steel plate as described in item (2) of the testing method and was cured under the curing conditions shown in Table 10 to prepare a sample plate coated with a transparent cured film. The resulting test samples were subjected to the following tests on surface hardness, adhesion properties, heat resistance, incombustibility, water impermeability, acid resistance, alkali resistance, deflection resistance and weatherability (see the items of testing methods) to examine properties of the siloxane polymer compositions as the adhesive polymer compositions. Results thus obtained are also shown in table 10.

Testing method:

(6) Incombustibility

Each sample was placed in a 450° C. electrical furnace into which enough oxygen was supplied. Samples showing no self-burning properties and not changing to charcoal carbon were scored as having "good" incombustibility, and samples suffering such abnormality were scored as having "bad" incombustibility.

(7) Water impermeability

Each of the sample compositions was applied to Toyo filter paper No.6, and the thus-prepared test piece was applied to a funnel of gravity filtration. Water was poured into the funnel, and an amount of water passing through the sample was determined. Samples not allowing water to pass therethrough were scored as having "good" water impermeability, and samples permitting any water to pass therethrough were scored as having "bad" water impermeability.

(8) Acid resistance

Acid resistance was determined according to the coat-heating test described in JIS K 5400, 7.5. That is, each test piece prepared by coating the composition on a glass plate was dipped in a 20° C., 5 wt % sulfuric acid solution for 30 days. Samples suffering no blisters, bubbles, peeling, holes, softening and dissolution were scored as having "good" acid resistance, and samples suffering such abnormality were scored as having "bad" acid resistance.

(9) Alkali resistance (Na resistance)

About 5 cc of a sodium hydroxide (NaOH) solution adjusted to pH 10 was placed on each of the test piece with covering it by a watch glass to prevent vaporization of the solution. After being allowed to stand at room temperature for 24 hoours, the coated surface was washed and observed. Samples undergoing no changes were scored as having "good" alkali resistance, and samples suffering abnormality such as dissolution were scored as having "bad" alkali resistance.

(10) Deflection resistance

Each sample was deflected around a round shaft of 3 mm φ using a deflection tester described in JIS K 5400, 6.16. Samples showing no abnormality were scored as having "good" resistance against deflection, and samples suffering abnormality were scored as having "bad" resistance against deflection.

(11) Weatherability (weatherometer)

Each test sample was subjected to iradiation-dropwise condensation cycle for 2500 hours at 55±15° C. using a weatherometer of model QUV (280 to 320 nm in wavelength region). Gloss of each sample was measured before and after the irradiation. Samples showing a gloss reduction (%) within 10% were scored as having "good" weatherability, and samples showing a gloss reduction (%) more than 10% were scored as having "bad" weatherability.

TABLE 10

| Sample No. | PC-1 | PC-2 | PC-3 | PC-4 | PC-5 | PC-6 | PC-7 |
|---|---|---|---|---|---|---|---|
| OS Liquid Composition | S-1 | S-4 | S-6 | S-9 | S-11 | S-12 | S-13 |
| Curing °C. | 25 | 25 | 25 | 80 | 150 | 200 | 200 |
| Condition Hours | 48 | 48 | 48 | 1 | 0.35 | 0.10 | 0.10 |
| Hardness | 3H | 2H | 2H | 4H | 4H | 4H | 4H |
| Adhesion | 25/25 | 25/25 | 25/25 | 25/25 | 25/25 | 25/25 | 25/25 |
| Heat Resistance | good | good | good | good | good | good | good |
| Incombustibility | good | good | good | good | good | good | good |
| Acid Resistance | good | good | good | good | good | good | good |
| Na Resistance | good | good | good | good | good | good | good |
| Against Deflection | good | good | good | good | good | good | good |
| Weatherability | good | good | good | good | good | good | good |

It can be seen, from the above results, that, when exposed to the atmosphere of up to 300° C. after being coated, the aqueous organosiloxane liquid composition of the present invention forms a transparent cured film. This transparent film has good heat resistance, good incombustibility, good acid resistance, good alkali resistance, good resistance against deflection and good weatherability, and is useful as a film for protecting a substrate or as a binder.

IV-2 Application as a filler-containing film or binder

Fillers (E) (an activating agent, a filler, a pigment, a colorant, etc.) used in this example are shown in Table 11. Additionally, these fillers were previously subjected to drying treatment at about 200° C. before use to remove water adhering or adsorbing thereto to some extent. In addition, their particle size was adjusted before use.

TABLE 11

| Sample No. | Name of Filler | Major Component | Particle Size |
|---|---|---|---|
| F-1 | Silica stone powder | $SiO_2$ | up to 44μ |
| F-2 | Calcined aluminum silicate | $Al_2O_3$ $SiO_2$ | up to 44μ |
| F-3 | Talc powder | MgO $SiO_2$ | up to 44μ |
| F-4 | Fumed silica | $SiO_2$ | up to 10μ |
| F-5 | Alumina powder | $Al_2O_3$ | up to 44μ |
| F-6 | Silicon carbide powder | SiC | up to 10μ |
| F-7 | Mineral fiber powder | $Al_2O_3$ $SiO_2$ | up to 44μ |
| F-8 | Glass beads | $SiO_2$ | up to 80μ |
| F-9 | Silicon phosphate powder | $2SiO_2$ $P_2O_5$ | up to 44μ |
| F-10 | Boron phosphate powder | $B_2O_3$ $P_2O_5$ | up to 10μ |
| F-11 | Zinc chromate powder | ZnO $CrO_3$ | up to 20μ |
| F-12 | Special glaze powder | PbO $SiO_2$ $B_2O_3$ | up to 10μ |
| F-13 | Titanium oxide | $TiO_2$ | up to 5μ |
| F-14 | Organic red pigment | Quinacridone type | up to 5μ |
| F-15 | Aluminum powder paste | Al | up to 100μ |

A mixed OS liquid composition was first prepared from the aqueous organosiloxane liquid composition of the present invention in the following manner, then the mixed OS liquid composition was exposed to the atmosphere of up to 300° C. to form an adhesive polymer. Various properties of the polymer were evaluated.

An intermediate mixed liquid composition was prepared by mixing a powdery filler (an activating agent, a filler, a pigment or a colorant) of up to 200 microns in size shown in Table 11 with a liquid composition selected from the liquid compositions shown in the column of "OS-P composition and resin" in Table 5 as shown in table 12. This intermediate mixed liquid composition was subjected to the preliminary treatment under the conditions shown in Table 12 to thereby stabilize. Then, polyether-modified dimethylpolysiloxane (symbol: SW-1) selected as an aqueous modified organosilicon compound shown in Table 1 was added thereto in an amount (parts by weight) shown in Table 12 based on the liquid composition of "OS-P composition and resin". To this mixed liquid composition were further added a cross-linking agent (OS-B) shown in Table 8 (S series) and a curing catalyst as shown in Table 12. Thus, there were prepared 7 kinds of mixed OS liquid compositions. These OS liquid compositions were used as coating compositions or binders having some fluidity or plasticity.

Each of the OS liquid compositions containing the fillers was subjected to the curing conditions shown in Table 12 to prepare coating samples or solidified samples. The thus obtained samples were subjected to the tests on surface hardness, adhesion properties, heat resistance, incombustibility, water impermeability, acid resistance, alkali resistance, resistance against deflection and weatherability (see the items of the foregoing testing methods) and to the adhesion test (12) shown below to evaluate the properties as a siloxane polymer composition. Results thus obtained are also shown in Table 12.

Testing method

(12) Adhesion properties

A prepared liquid sample was cast into a 40×40×15 cm frame formed on a steel plate, and was subjected to the curing step at 25° C. for 7 days to prepare a test piece wherein the test cured product was adhered to the steel plate.

Then, each test piece was adhered to an attachment of a tester according to the adhesion-testing method prescribed by the Building Research Institute of the Ministry of Construction, and was pulled upward through hydraulic power of the tester to determine the load (P) at which the adhesion between the steel plate and the solidified test piece was broken. Adhesion force was determined from the load and presented in terms of $kg/cm^2$.

TABLE 12

| Sample No. | | PE-1 | PE-2 | PE-3 | PE-4 | PE-5 | PE-6 | PE-7 |
|---|---|---|---|---|---|---|---|---|
| OS Liquid Composition | | S-6 | S-29 | S-1 | S-9 | S-11 | S-10 | S-30 |
| OS-PB Composition (Table 5) | Symbol | PB-6 | PB-4 | PB-1 | PB-9 | PB-11 | PB-10 | PB-4 |
| | Parts by Weight | 38 | 42 | 35 | 38 | 36 | 35 | 60 |
| Filler (parts by weight) | F-1 | — | 7 | — | — | — | 20 | — |
| | F-2 | 10 | 5 | 5 | 5 | 30 | 30 | 30 |
| | F-3 | — | 10 | 5 | 10 | 2 | 3 | 3 |
| | F-4 | — | 3 | — | — | 3 | 5 | 5 |
| | F-5 | — | — | 20 | — | 20 | — | — |
| | F-6 | — | — | 20 | 10 | — | — | — |
| | F-7 | — | — | — | — | — | 10 | 10 |
| | F-8 | — | — | 75 | 90 | 250 | 100 | 100 |
| | F-10 | — | — | 5 | 10 | — | — | — |
| | F-11 | — | — | — | 10 | 10 | — | — |
| | F-12 | — | — | 20 | — | — | — | — |
| | F-13 | — | 30 | 5 | 20 | 20 | — | 10 |
| | F-14 | 15 | — | — | — | — | — | — |
| | F-15 | — | — | 20 | — | — | — | — |
| Conditions of preliminary step, °C · h | | 25 × 24 | 60 × 3 | 25 × 24 | 30 × 12 | 15 × 48 | 80 × 1 | 25 × 24 |
| Parts of OS-W | | 5 | 5 | 5 | 5 | 5 | 5 | 5 |
| Parts of Crosslinking agent | | 30 | 40 | 25 | 25 | 40 | 30 | 40 |
| Curing agent | Kind | C-5 | C-12 | C-5 | C-5 | C-5 | C-5 | C-13 |
| | Parts by weight | 3 | 2 | 2 | 3 | 3 | 3 | 3 |
| Application Manner | | spray | spray | spray | roll | trowel | trowel | trowel |
| Curing temp. °C. | | 22 | 200 | 150 | 30 | 25 | 25 | 25 |
| Curing time H | | 48 | 0.05 | 0.3 | 32 | 48 | 48 | 48 |
| Main uses | | *1 | *2 | *3 | *4 | *5 | *6 | *7 |
| Test results | Hardness | 3H | 4H | 4H | 4H | 8H | 7H | 7H |
| | Adhesion | good | good | good | good | good | good | good |
| | Heat resistance | good | good | good | good | good | good | good |
| | Incombustibility | good | good | good | good | good | good | good |
| | Acid resistance | good | good | good | good | good | good | good |
| | Na resistance | good | good | good | good | good | good | good |
| | Deflection resistance | good | good | good | good | good | good | good |
| | Weatherability | good | good | good | good | good | good | good |
| | Adhesion properties | 22 | 28 | 30 | 30 | 35 | 40 | 40 |

*1: Enamel coating composition dried at ordinary temperature, coating material, thin film molding, etc.
*2: Enamel coating composition dried at high temperature, coating composition, coating material, etc.
*3: Heat-resistant coating composition dried by heating, coating material, etc.
*4: Rust proof coating material dried at ordinary temperature, coating material, etc.
*5: Flooring, building material, sprayable wall material, coating material, etc.
*6: Binder, adhesive, etc.
*7: Anchorage material, binder, etc.

It can be seen, from the above results, that the mixed OS liquid composition comprising the aqueous organosiloxane liquid composition of the present invention in a form of a coating composition to be dried at ordinary temperature or under heating, adhesive, binder, anchor material or the like forms, when exposed to the atmosphere of up to 300° C., an adhesive polymer composition in a coating film or a binder having excellent heat resistance, good weatherability, etc.

EXAMPLE 5

Reinforcing agents, aggregates, moldings, etc. used in this Example are shown in Table 13. Additionally, these materials were previously subjected to drying treatment at about 200° C. before use to enough dehydrate.

TABLE 13

| Sample No. | Name of Material | Major Component | Size |
|---|---|---|---|
| M-1 | Sandy silica stone | $SiO_2$ | 220–2,000μ |
| M-2 | Sandy silica stone | $SiO_2$ | 1,000–5,000μ |
| M-3 | Sandy alumina | $Al_2O_3$ | 220–2,000μ |
| M-4 | Sandy silicon carbide | SiC | 220–2,000μ |
| M-5 | Artificial aggregate particles | $SiO_2$ $Al_2O_3$ | 500–2,000μ |
| M-6 | Fibrous metal | stainless steel | 0.3 × 12 mm |
| M-7 | Wire gauze | iron | 0.3 mmø with 5-mm space |
| M-8 | Net | nylon | 0.2 mmø with 2-mm space |
| M-9 | Massive industrial waste | $Na_2SO_4$ | 2 cmø × 1.5 cm |

V Application as a composite structure

Materials (reinforcing agents, aggregates and moldings) of at least 200μ in size shown in Table 13 were added to the mixed OS liquid composition prepared in the item of the adhesive polymer composition from the aqueous organosiloxane liquid composition, and the resulting composite compositions were exposed to the atmosphere of up to 300° C. to prepare samples of the composite structure. These samples were subjected to the following tests on heat resistance, incombustibility, weatherability and compression strength to evaluate the properties thereof. Results thus obtained are also shown in Table 14.

Testing method:

(1) Heat resistance; (2) Incombustibility; and (3) Weatherability:

The same as with the test of transparent film.

(13) Compression strength:

Each of the composite structure compositions was prepared in a rectangular frame (2×2×8 cm) according to JIS A 1108 and, after leaving for 7 days at room temperature, the frame was removed, followed by determining compression strength ($kg/cm^2$) according to JIS A 1132 using a compression tester.

TABLE 14

| Sample No. | | N-1 | N-2 | N-3 | N-4 | N-5 |
|---|---|---|---|---|---|---|
| Symbol of OS Liqid Composition | | S-9 | S-1 | S-29 | S-30 | S-6 |
| OS composition (Table 12) | No. | PE-4 | PE-3 | PE-2 | PE-7 | PE-1 |
| | Parts by weight | 100 | 100 | 100 | 100 | 100 |
| Materials and amounts thereof (parts by weight) | M-1 | 40 | — | — | — | — |
| | M-2 | — | 100 | — | — | — |
| | M-3 | — | 100 | — | — | — |
| | M-4 | — | 200 | — | — | — |
| | M-5 | 100 | 100 | — | — | — |
| | M-6 | 100 | — | — | — | — |
| | M-7 | — | — | 1000 | — | — |
| | M-8 | — | — | — | 100 | — |
| | M-9 | — | — | — | — | 400 |
| Application manner | | * | * | ** | ** | ** |
| Curing temp. | (°C.) | 20 | 80 | 100 | 25 | 20 |
| | (H) | 96 | 0.4 | 0.3 | 72 | 96 |
| Test results | Heat resistance | good | good | good | good | good |
| | Incombustibility | good | good | good | good | good |
| | Weatherability | good | good | good | good | good |
| | Compression Strength | 220 | 250 | 300 | 300 | 135 |
| Main uses | | *1 | *2 | *3 | *4 | *5 |

*Mixing;
**Casting
*1: Thick flooring, wall material, etc.
*2: Heat-resistant flooring, wall material, etc.
*3: Building materials, sheets, etc.
*4: Building materials, sheets, etc.
*5: Treatment of wastes, solid material, etc.

It can be seen, from the above-results, that various reinforcing materials, aggregates, moldings, etc. can be unified with the mixed composition of the aqueous organosiloxane liquid composition of the present invention and the filler and, when exposed to the atmosphere of up to 300° C., they can form a composite structure having excellent heat resistance, excellent incombustibility, excellent weatherability, excellent compression strength, etc.

EXAMPLE 6

VI Application as a sheet

A commercially available, incombustible glass fiber texture (sample No. R-1) and a 325-mesh flexible metal gauze made of stainless steel fibers (sample No. R-2) were selected as the sheet bases. Each of these sheet bases was impregnated with the mixed OS liquid composition prepared in the foregoing item IV (adhesive polymer composition) using the aqueous organosiloxane liquid composition of the present invention to prepare composite sheet compositions. The sheet compositions were then subjected to the curing conditions shown in Table 15 to prepare composite sheet samples of siloxane cured products. These were subjected to the tests on flexibility, heat resistance, incombustibility and weatherability to examine the properties of the composite sheets. Results thus obtained are also shown in Table 15.

TABLE 15

| Sample No. | | RS-1 | RS-2 | RS-3 | RS-4 |
|---|---|---|---|---|---|
| Sheet Base | | R-1 | | R-2 | |
| OS Liquid Composition | | S-6 | S-29 | S-6 | S-29 |
| Mixed OS Liquid Composition | | PE-1 | PE-2 | PE-1 | PE-2 |
| Curing temperature (°C.) | | 25 | 80 | 22 | 150 |
| Curing time (H) | | 96 | 0.4 | 96 | 0.3 |
| Test results | Flexibility | good | good | good | good |
| | Heat resistance | good | good | good | good |
| | Incombustibility | good | good | good | good |
| | Weatherability | good | good | good | good |

It can be seen, from the above-results, that a sheet base impregnated with a mixture of the aqueous organosiloxane liquid composition of the present invention and the fillers can be unified into a composite sheet when exposed to the atmosphere of up to 300° C., and that this composite sheet has excellent flexibility, high heat resistance, good incombustibility giving off no harmful gases and good weatherability.

EXAMPLE 7

VII Application as a building material

A commercially available asbestos plate (sample No. U-1), a building material base made of dense concrete material and reinforced with glass fibers (sample No. U-2) and an iron-made outer wall (sample No. U-3) were selected as base substrates. Mixed OS liquid composition prepared in the foregoing item IV (adhesive polymer composition) using the aqueous organosiloxane liquid composition of the present invention were spray-coated on these substrates, and were subjected to the curing conditions shown in Table 16 to prepare building material samples. The samples were subjected to the tests to examine surface hardness, heat resistance, incombustibility and weatherability. Results thus obtained are also shown in Table 16.

TABLE 16

| Sample No. | | UM-1 | UM-2 | UM-3 | UM-4 | UM-5 | UM-6 |
|---|---|---|---|---|---|---|---|
| Sheet Base | | U-1 | | U-2 | | U-3 | |
| OS Liquid Composition | | S-6 | S-29 | S-6 | S-29 | S-6 | S-29 |
| Composite OS Liquid Composition | | PE-1 | PE-2 | PE-1 | PE-2 | PE-1 | PE-2 |
| Curing temperature (°C.) | | 25 | 80 | 22 | 150 | 25 | 200 |
| Curing time (H) | | 96 | 0.4 | 96 | 0.3 | 96 | 0.03 |
| Test results | Surface hardness | 3H | 4H | 3H | 4H | 3H | 4H |
| | Heat resistance | good | good | good | good | good | good |
| | Incombustibility | good | good | good | good | good | good |
| | Weatherability | good | good | good | good | good | good |

It can be seen, from the above results, that building materials obtained by applying the coating composition composed of the mixed liquid composition of the aqueous organosiloxane liquid composition of the present invention and the filler to a building material base and subsequently exposing to the atmosphere of up to 300° C. can form have excellent heat resistance, good incombustibility, and good weatherability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A curable homogeneous silicon-containing liquid composition comprising:

(A) a liquid organosilicon compound containing at least one polyether group and having water dissolved therein;

(B) a low molecular weight, liquid organopolysiloxane containing a SiX group, wherein X is hydrogen, a monovalent hydrocarbyl group or $OR^1$ wherein $R^1$ is hydrogen or a $C_1$–$C_5$ alkyl group;

(C) as a crosslinking agent, at least one organometallic compound of the formula

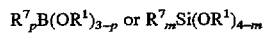

$$R^7_p B(OR^1)_{3-p} \text{ or } R^7_m Si(OR^1)_{4-m}$$

wherein $R^7$ is hydrogen, a monovalent hydrocarbyl group or $OR^1$; $R^1$ is hydrogen or a $C_1$–$C_5$ alkyl group; p is 0, 1 or 2; and m is 0, 1, 2 or 3;

(D) as a metal-containing curing catalyst, at least one zinc-, aluminum-, titanium-, zirconium- or tin- containing organic compound.

2. A liquid composition according to claim 1, wherein the pH of the composition is from 3 to less than 7.

3. A liquid composition according to claim 1, wherein the pH of the composition is from 7 to less than 10.

4. A liquid composition according to claim 1, wherein the liquid organopolysiloxane (B) is a low molecular weight polysiloxane of the formula

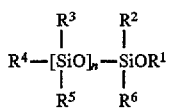

wherein $R^1$ is hydrogen or a $C_1$ to $C_5$ alkyl group, $R^2$ to $R^6$, which may be the same or different, each is hydrogen, $OR^1$ or a monovalent hydrocarbyl group and n is a number smaller than 15; said polysiloxane containing at least 50% by weight of Si as $SiO_2$.

5. A liquid composition according to claim 1, wherein the cross-linking agent (C) is an organotrialkoxysilane containing an amino-substituted organic group.

6. A liquid composition according to claim 1, wherein the liquid organopolysiloxane (B) contains dissolved therein up to 70% by weight of an OR substituted solid silicone, wherein R is hydrogen or a $C_1$–$C_5$ alkyl group.

7. A liquid composition according to claim 1, wherein the liquid organopolysiloxane (B) contains dissolved therein up to 60% by weight of an acyl-group substituted linear high molecular thermoplastic resin.

8. A liquid composition according to claim 1, which contains 1 to 500 parts by weight of one or more fillers, an activating agent, pigments or colorants.

9. A liquid composition according to claim 8, wherein the activating agent is a powder of a boric acid-containing compound, chromic acid-containing compound or phosphoric acid-containing compound.

10. A liquid composition according to claim 1, wherein the curing catalyst (D) is a blocked catalyst comprising the metal in a complex with a ligand selected from the group consisting of β-keto-acid esters, β-diketones and malonic esters.

11. A liquid composition according to claim 1, wherein the catalytic activity of the curing catalyst (D) is retarded by inclusion of an alcohol in the liquid composition.

12. A liquid composition according to claim 1, wherein the total content of the metal elements in the liquid composition is from 20 to less than 65% by weight.

13. The cured polyorganosiloxane formed by curing the liquid composition of claim 1 by exposure to the atmosphere at a temperature of up to 300° C.

14. An adhesive coating or binder formed by curing the liquid composition of claim 1 by exposure to the atmosphere at a temperature of up to 300° C.

* * * * *